(12) United States Patent
Fukuchi

(10) Patent No.: US 8,482,570 B2
(45) Date of Patent: Jul. 9, 2013

(54) PARALLEL IMAGE PROCESSING APPARATUS AND METHOD WITH SAMPLING PATTERN

(75) Inventor: Hideo Fukuchi, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 862 days.

(21) Appl. No.: 12/648,009

(22) Filed: Dec. 28, 2009

(65) Prior Publication Data

US 2010/0177108 A1 Jul. 15, 2010

(30) Foreign Application Priority Data

Jan. 9, 2009 (JP) .................................. 2009-003100

(51) Int. Cl.
*G06F 15/80* (2006.01)
*G06T 1/20* (2006.01)

(52) U.S. Cl.
USPC .......................................... 345/505; 345/506

(58) Field of Classification Search
None
See application file for complete search history.

(56) References Cited

U.S. PATENT DOCUMENTS

| | | | | |
|---|---|---|---|---|
| 5,289,577 A | * | 2/1994 | Gonzales et al. | 345/506 |
| 5,461,679 A | * | 10/1995 | Normile et al. | 382/304 |
| 5,794,016 A | * | 8/1998 | Kelleher | 345/505 |
| 6,549,644 B1 | * | 4/2003 | Yamamoto | 382/118 |
| 6,587,110 B1 | * | 7/2003 | Kunimatsu et al. | 345/502 |
| 6,700,580 B2 | * | 3/2004 | Lefebvre et al. | 345/506 |
| 6,844,879 B2 | * | 1/2005 | Miyauchi | 345/502 |
| 6,965,647 B1 | * | 11/2005 | Carrig | 375/240.27 |
| 7,196,708 B2 | * | 3/2007 | Dorojevets et al. | 345/502 |
| 7,460,126 B2 | * | 12/2008 | Grantham et al. | 345/505 |
| 2006/0251330 A1 | * | 11/2006 | Toth et al. | 382/236 |
| 2008/0069469 A1 | * | 3/2008 | Yan et al. | 382/261 |
| 2008/0101727 A1 | * | 5/2008 | Talla | 382/303 |

FOREIGN PATENT DOCUMENTS

| | | |
|---|---|---|
| JP | A-09-275564 | 10/1997 |
| JP | A-2000-312311 | 11/2000 |

* cited by examiner

*Primary Examiner* — Carlos Perromat
(74) *Attorney, Agent, or Firm* — Oliff & Berridge, PLC

(57) ABSTRACT

An image processing apparatus includes: an image division section which divides input image data configuring one screen into N (N is an integer of 2 or more) image blocks; and N image processing sections which carry out image processings in parallel on every N image blocks, an ith (i is an integer of 1 to N) image processing section including: a first image block memory; K (K is an integer of 2 or more) image quality adjustment sections; (K−1) buffer memories; a second image block memory; and a pixel data acquisition section, wherein each image quality adjustment section selects processing subject pixels, in order from pixels positioned outside toward pixels positioned inside the ith image block, and carries out the image quality adjustment, and at least one of the second to Kth image quality adjustment sections is a filtering section which carries out a filtering process.

6 Claims, 19 Drawing Sheets

PARALLEL IMAGE PROCESSING APPARATUS AND METHOD WITH SAMPLING PATTERN

BACKGROUND

1. Technical Field

The present invention relates to an image processing apparatus, an image display apparatus and an image processing method, which divide image data configuring one screen into a plurality of image blocks, and carry out a plurality of image quality adjustments on each divided image block.

2. Related Art

To date, as a technology of processing a higher definition video than that of an existing NTSC television, a technology has been known which divides input image data into a plurality of image blocks, and carries out a predetermined image quality adjustment in parallel on each divided image block (JP-A-9-275564 and JP-A-2000-312311)

In the event that the predetermined image quality adjustment is a filtering process, it is necessary to acquire pixel data of adjacent image areas as necessary. A technology of storing the divided image data, and a video (pixels) of one portion of adjacent image data, in an identical field memory, and carrying out a filtering process, is disclosed in JP-A-2000-312311. However, in a case of carrying out a plurality of filtering processes on the divided image blocks, a large capacity field memory storing image blocks necessary for the filtering processes is required for each filtering process. For this reason, a problem occurs in that costs are high with an image processing apparatus which carries out the plurality of filtering processes. Also, a problem occurs in that a video output is delayed with respect to a video input by an amount corresponding to the provision of the field memory. These problems are common not only to the technology of processing the high definition video, but also to a technology of dividing input image data into a plurality of image blocks, and carrying out a plurality of image quality adjustments on each divided image block.

SUMMARY

An advantage of some aspects of the invention is to provide a technology whereby, in an image processing apparatus which divides input image data into a plurality of image blocks, and carries out a plurality of image quality adjustments on each divided image block, an image data processing speed is increased. Also, another advantage is to provide a technology whereby it is possible to carry out the plurality of image quality adjustments with a small memory capacity.

The invention can be realized as the following embodiments or application examples.

APPLICATION EXAMPLE 1

An image processing apparatus includes an image division section which divides input image data configuring one screen into N (N is an integer of 2 or more) image blocks, and N image processing sections which carry out image processings in parallel on every N image blocks. An ith (i is an integer of 1 to N) image processing section includes a first image block memory which stores the whole of an ith image block divided by the image division section; K (K is an integer of 2 or more) image quality adjustment sections which sequentially carry out image quality adjustments in series on pixel data of the image block; (K−1) buffer memories which, being disposed one between two of the K image quality adjustment sections, store at least one portion of the image block after the image quality adjustment; a second image block memory which, being disposed in the stage subsequent to a Kth image quality adjustment section, stores the whole of the image block after the image quality adjustment; and a pixel data acquisition section which acquires pixel data in adjacent image blocks, as necessary, from another image processing section. Each image quality adjustment section selects processing subject pixels, in order from pixels positioned outside toward pixels positioned inside the ith image block, carrying out the image quality adjustment, and at least one of the second to Kth image quality adjustment sections is a filtering section which carries out a filtering process.

According to the image processing apparatus of Application Example 1, even though the kth (k is an integer between 2 and K inclusive) image quality adjustment section is a filtering section, it is possible, before pixel data of all the divided image blocks (hereafter referred to as "one block's worth of pixel data") are stored in the (k−1)th buffer memory, to acquire pixel data of adjacent image blocks required when carrying out the filtering process. Because of this, it is possible to carry out the filtering process with the kth filtering section before the one block's worth of pixel data are stored in the (k−1)th buffer memory. Therefore, it is possible to increase an image data processing speed in comparison with a case of selecting a processing subject pixel by means of a sequential scanning, and carrying out the filtering process.

For example, in a case of carrying out the filtering process using a filter matrix of five pixels vertically by five pixels horizontally (hereafter referred to as a "5×5 filter matrix"), when pixels in a one-pixel width frame-shaped image area, which are stored in the (k−1)th buffer memory, are defined as "one outer circumferential line's worth of pixels", it is possible to carry out a kth filtering process in the event that three outer circumferential lines' worth of pixel data are stored in the (k−1)th buffer memory. Details thereof will be described hereafter. The sequential scanning refers to repeating, until a pixel at the lower right corner of the screen, a procedure of starting a scanning from a pixel at the upper left corner of the one block's worth of pixel data, scanning toward a right direction, moving to the left end of the screen, as well as moving one line down the screen, when a pixel at the right end is reached, and scanning toward the right direction again.

APPLICATION EXAMPLE 2

In the image processing apparatus according to Application Example 1, K is an integer of 3 or more, at least two of the second to kth image quality adjustment sections are filtering sections which carry out the filtering process, and the memory capacity of each of buffer memories disposed in the stages previous to the filtering sections is smaller than the memory capacity of each of the first image block memory and second image block memory.

According to the image processing apparatus of Application Example 2, as well as it being possible to further increase the image data processing speed, it is possible to achieve a reduction in memory capacity used in video processing sections, in comparison with the case of carrying out the filtering process by selecting processing subject pixels using the sequential scanning. Also, it is sufficient that the number of second and subsequent filtering sections is an integer of 2 or more, but it is more preferable that it is an integer of 5 or more, and it is still more preferable that it is an integer of 10 or more. This is because, the larger the number of second and subsequent filtering processes, as well as it being possible to further increase the image data processing speed in the video processing sections, it is possible to further achieve the reduction in the memory capacity used in the video processing section, in comparison with the case of carrying out the filtering process by selecting processing subject pixels using the sequential scanning.

APPLICATION EXAMPLE 3

In the image processing apparatus according to Application Example or Application Example 2, a selection of processing subject pixels to be subjected to the image quality adjustment is carried out by sequentially selecting a one-pixel width frame-shaped image area from the outside toward the inside of the ith image block, and scanning four sides configuring the selected frame-shaped image area in a preset order.

According to the image processing apparatus of Application Example 3, it is possible to select processing subject pixels from the pixels stored in the memories, in order from pixels positioned outside toward pixels positioned inside.

APPLICATION EXAMPLE 4

In the image processing apparatus according to Application Example 1 or Application Example 2, the selection of processing subject pixels to be subjected to the image quality adjustment is carried out by scanning pixels in a spiral pattern.

According to the image processing apparatus of Application Example 4, by scanning pixels in the spiral pattern, it is possible to eliminate an unnecessary scanning, and shorten a scanning time. Therefore, it is possible to further increase the image data processing speed.

Also, as the image quality processing described in Application Examples 1 to 4, it is possible to use various kinds of image quality processing, such as a filtering process, a γ adjustment, a contrast adjustment, or a brightness adjustment. Furthermore, for the filtering process described in Application Examples 1 to 4, it is possible to use various kinds of filter, such as a smoothing filter, a median filter, an edge extraction filter, or a sharpening filter.

The invention, being realizable in various forms, can be realized in aspects of, for example, an image processing apparatus and image processing method, computer program for realizing a function of the apparatus or method, and a storage medium on which the computer program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, embodiments of the invention will be described in the following order.
A. First Embodiment and Comparison Example
B. Second Embodiment
C. Modification Examples

A. First Embodiment and Comparison Example

A-1. First Embodiment

Figure 1:
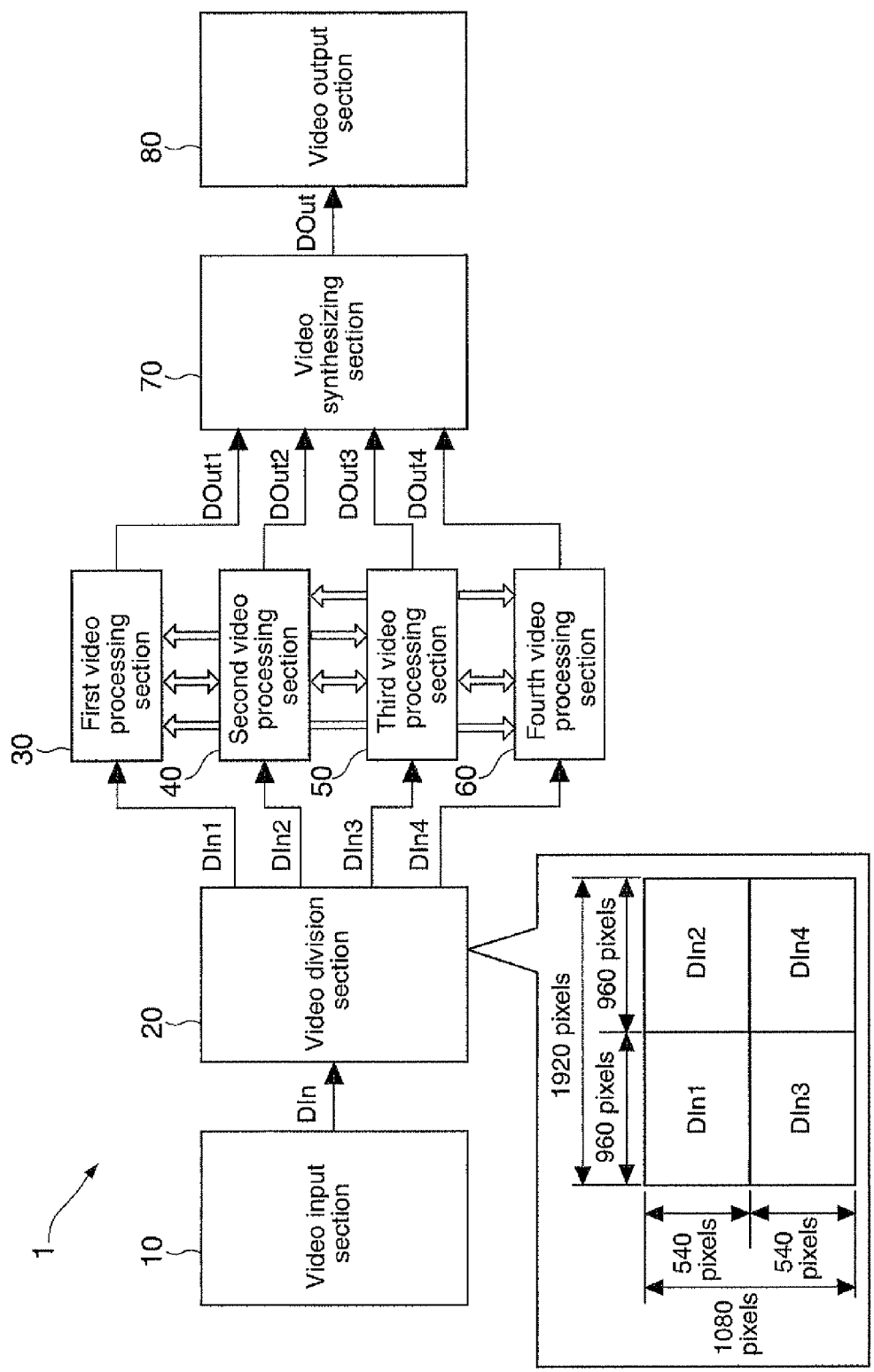
FIG. 1 is a diagram showing a configuration of a video signal processing apparatus as a first embodiment of the invention.

FIG. 1 is a diagram showing a configuration of a video signal processing apparatus 1 as a first embodiment of the invention. Herein, a description will be given taking as an example a high definition television of which one screen has 1920 pixels in a horizontal direction and 1080 pixels in a vertical direction. The video signal processing apparatus 1 includes a video input section 10, which converts an input analog video signal into a digital signal by means of an A/D conversion, a video division section 20, which divides digitized image data DIn into a plurality of image blocks, four video processing sections 30, 40, 50, and 60, which process the divided image blocks in parallel, a video synthesizing section 70, which synthesizes image blocks DOut 1 to 4 processed in parallel into image data of one screen, and a video output section 80, which outputs synthesized image data DOut as an output signal by means of a D/A conversion. Also, the blank arrows depicted between the four video processing sections 30 to 60 indicate how necessary image data are being exchanged between the video processing sections 30 to 60. Also, herein, an aspect is shown wherein the image data pin of one screen are divided by the video division section 20 into four blocks, each of which has 960 pixels in the horizontal direction and 540 pixels in the vertical direction, and the divided image blocks DIn 1 to DIn 4 are processed in parallel by the image processing sections 30 to 60. The four video processing sections 30 to 60 differing only in the positions of the image blocks which they are to process, their processing details are identical. Hereafter, a description will be given mainly of a configuration and operations of the third video processing section 50.

Figure 2:
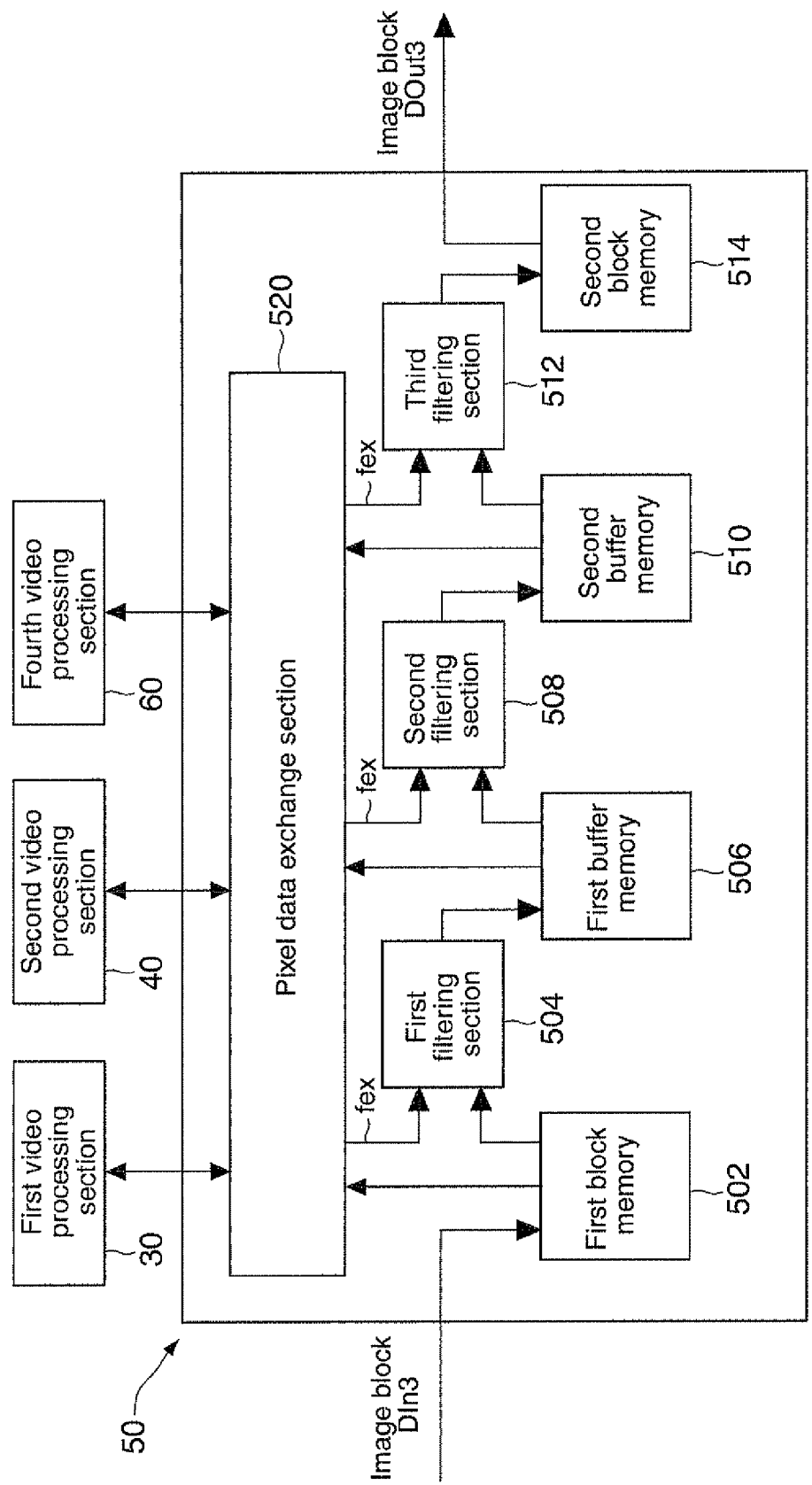
FIG. 2 is a block diagram showing an internal configuration of a third video processing section.

FIG. 2 is a block diagram showing an internal configuration of the third video processing section 50. The third video processing section 50 includes two block memories 502 and 514, three filtering sections 504, 508, and 512, two buffer memories 506 and 510 disposed one between two of the filtering sections 504, 508, and 512, and a pixel data exchange section 520 which acquires pixels of adjacent image blocks as necessary. The first block memory 502 stores the divided image block DIn3. The first filtering section 504 retrieves a pixel to be subjected to a first filtering process (hereafter called a "processing subject pixel" or an "attention pixel"), and peripheral pixels, from the first block memory 502, and carries out the first filtering process. The first buffer memory 506 stores pixel data on which the first filtering process has been carried out by the first filtering section 504. The second filtering section 508 retrieves the attention pixel and peripheral pixels from the first buffer memory 506, carrying out a second filtering process. The second buffer memory 510 stores pixel data on which the second filtering process has been carried out by the second filtering section 508. The third filtering section 512 retrieves the attention pixel and peripheral pixels from the second buffer memory 510, carrying out a third filtering process. The second block memory 514 stores one block's worth of pixel data on which the third filtering process has been carried out by the third filtering section 512. The pixel data exchange section 520 corresponds to a pixel data acquisition section described in the claims.

Figure 3:
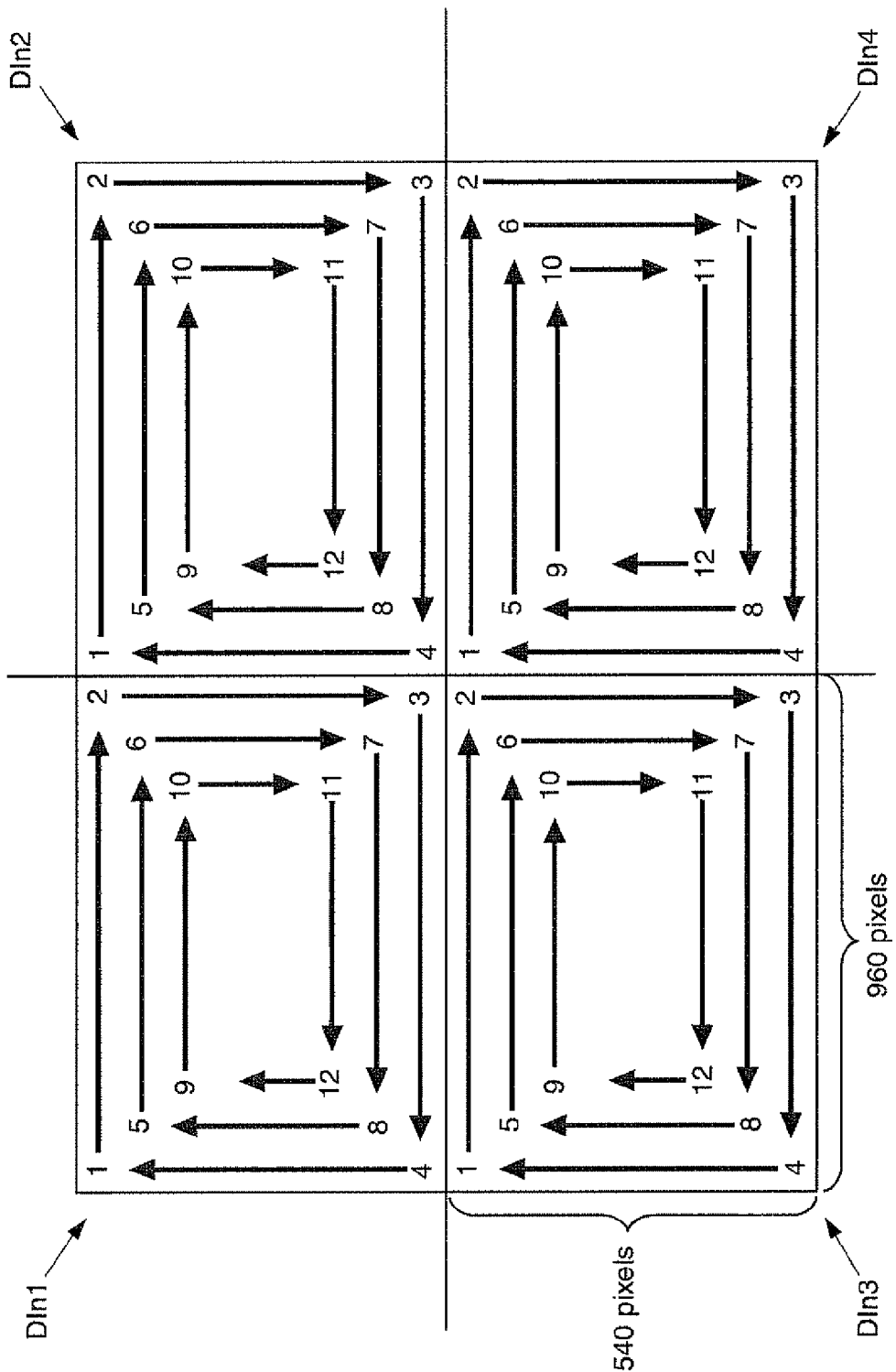
FIG. 3 is a diagram showing a procedure of selecting an attention pixel when carrying out a filtering process with each filtering section.

FIG. 3 is a diagram showing a procedure of selecting an attention pixel when carrying out a filtering process with each filtering section 504, 508, and 512. Attention pixels are selected in order from pixels positioned outside toward pixels positioned inside each of the four image blocks DIn1 to DIn 4, each of which is divided into 960×540 pixels. In the case of the first embodiment, attention pixels are selected by a scanning in the order of the numbered arrows (in the order of numbers 1, 2, 3 . . . ) from a pixel positioned at the upper left. Hereafter, this kind of pixel selection method will be called a "spiral scanning". When numbers 1 to 4 are scanned in the order of the arrow identified by number 1, the arrow identified by number 2, the arrow identified by number 3, and the arrow identified by number 4, four sides configuring a one-pixel width frame-shaped image area are scanned.

Figure 4:
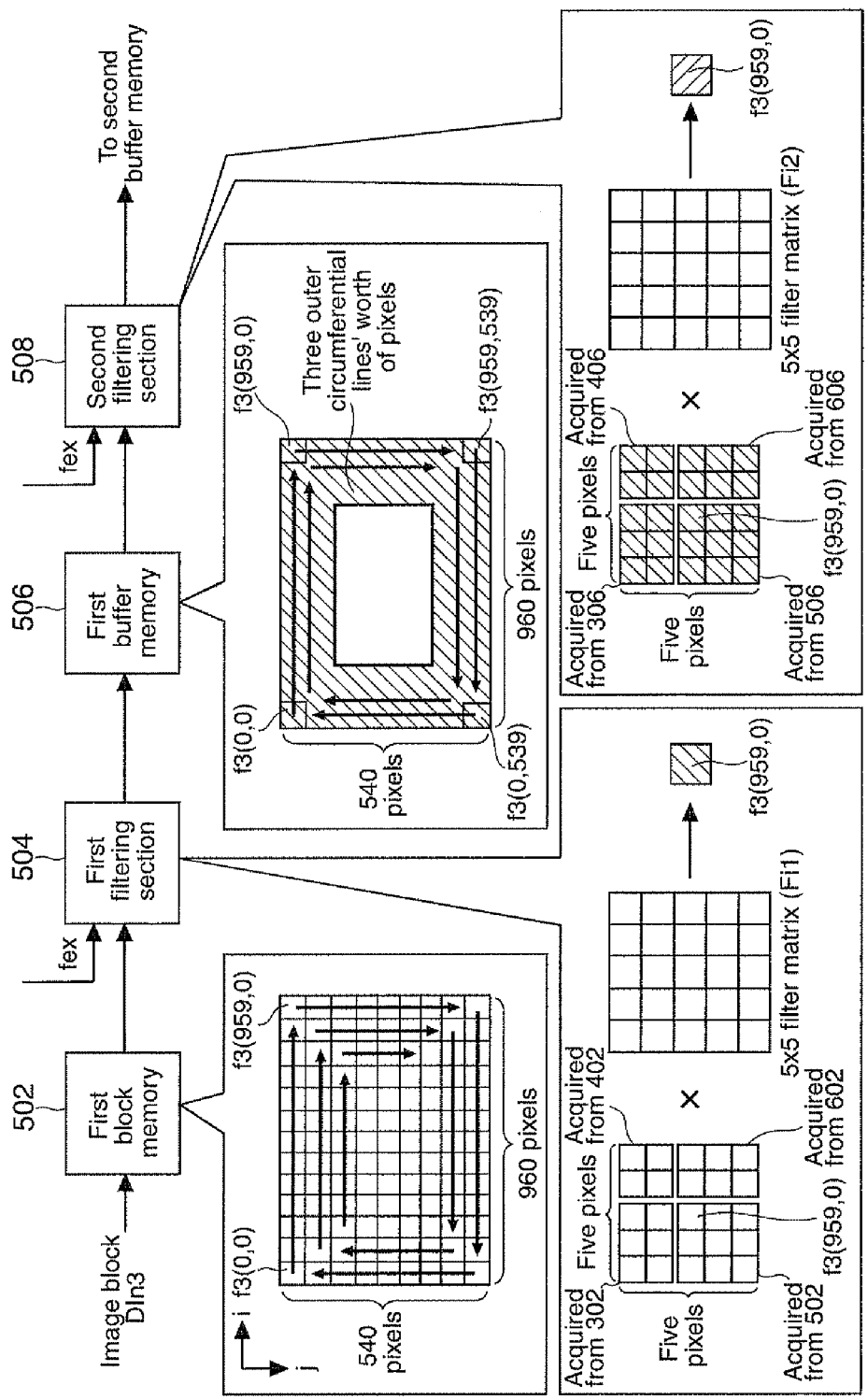
FIG. 4 is a diagram showing processing details of a first block memory to second filtering section of the first embodiment.

FIG. 4 is a diagram showing processing details of the first block memory 502 to second filtering section 508 of the first embodiment. The image block DIn3 divided by the video division section 20 in the previous stage is stored in the first block memory 502. On one block's worth of image data being stored in the first block memory 502, the first filtering section 504 scans pixels by means of the spiral scanning, carrying out the first filtering process.

The first filtering section 504 carries out the first filtering process using a 5×5 filter matrix (Fi1). In this case, in order to carry out the first filtering process on the attention pixel, pixel data equivalent to a total of 25 pixels, five pixels vertically by five pixels horizontally, with the attention pixel as a center, are required. Therefore, in the event that pixel data of the adjacent image blocks are required, necessary pixel groups (hereafter referred to as "adjacent pixel groups") are acquired utilizing the pixel data exchange section 520 (refer to FIG. 2). For example, in a case in which the first filtering process is carried out on an attention pixel f3 (959, 0) at coordinates (959, 0), the pixel data exchange section 520 acquires adjacent pixel groups stored one each in a first block memory 302 of the first video processing section 30, a first block memory 402 of the second video processing section 40, and a first block memory 602 of the fourth video processing section 60. Subsequently, the first filtering process is carried out on the attention pixel f3 (959, 0) using the pixel data of the 5×5 pixels with the attention pixel f3 (959, 0) as a center. "fex" described with each of the arrows toward the first and second filtering sections 504 and 508 in FIG. 4 indicates an adjacent pixel group.

The first buffer memory 506 stores the pixel data on which the first filtering process has been carried out by the first filtering section 504. At a point at which three outer circumferential lines' worth of pixel data are stored in the first buffer memory 506, the second filtering section 508 scans the inside of the image block again by means of the spiral scanning, starting the second filtering process. Herein, the three outer circumferential lines' worth of pixel data indicate pixel data configuring a three-pixel width frame-shaped image area.

The second filtering section 508 carries out the second filtering process using a 5×5 filter matrix (Fi2). In this case, the second filtering section 508 acquires adjacent pixel groups from the pixel data exchange section 520 as necessary. In the case of the first embodiment, as three outer circumferential lines' worth of pixel data are also stored in each of first buffer memories 306, 406, and 606 of the other video processing sections 30, 40, and 60, it is possible to acquire the adjacent pixel groups utilizing the pixel data exchange section 520. For example, in a case of carrying out the second filtering process on the attention pixel f3 (959, 0), the adjacent pixel groups stored one each in the first buffer memory 306 of the first video processing section 30, the first buffer memory 406 of the second video processing section 40, and the first buffer memory 606 of the fourth video processing section 60 are acquired utilizing the pixel data exchange section 520. Subsequently, the second filtering section 508, based on pixel data of 5×5 pixels with the attention pixel as a center, carries out the second filtering process on the attention pixel f3 (959, 0).

Figure 5:
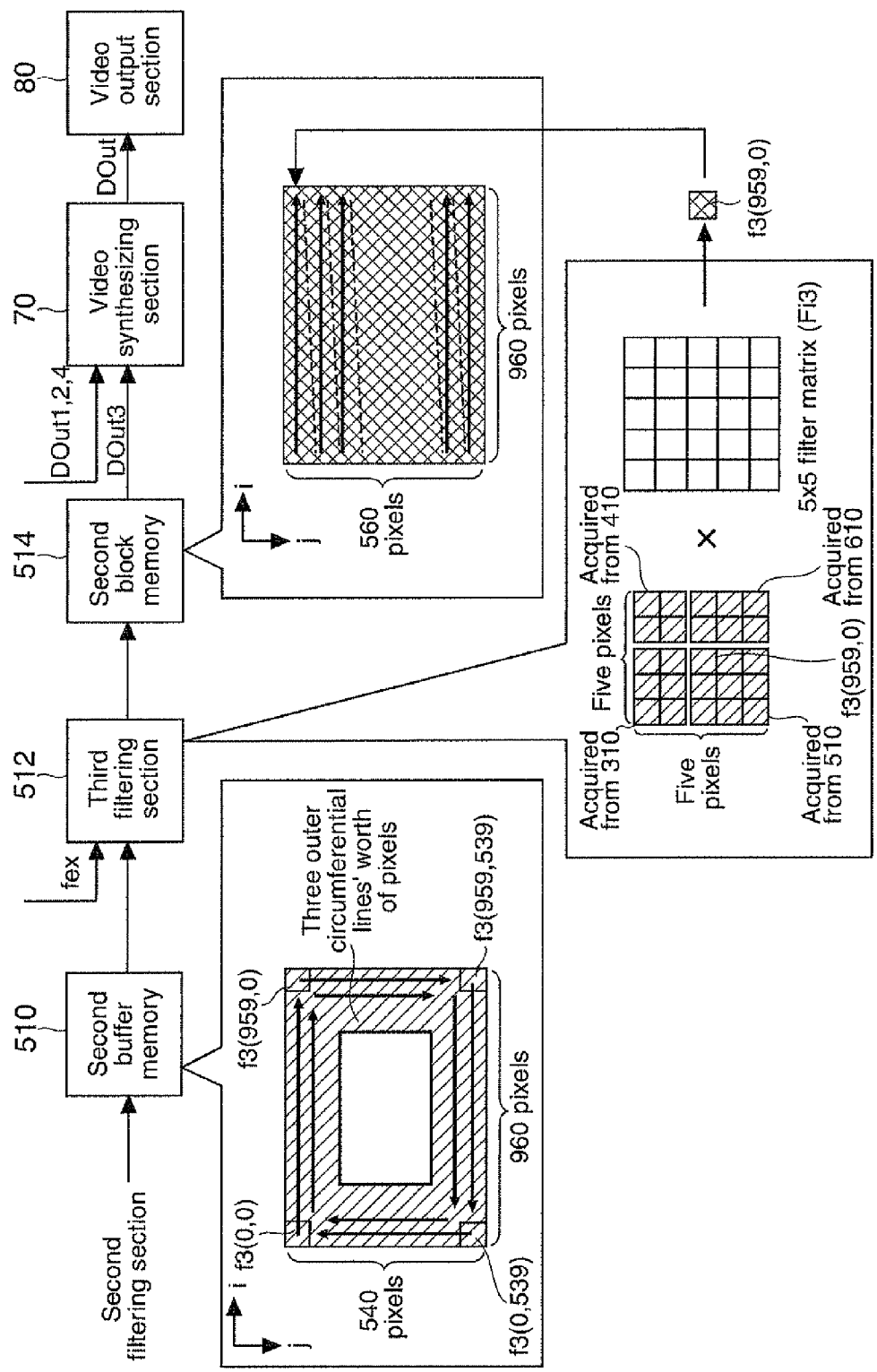
FIG. 5 is a diagram showing processing details of a second buffer memory to video output section of the first embodiment.

FIG. 5 is a diagram showing processing details of the second buffer memory 510 to video output section 80 of the first embodiment. The second buffer memory 510 stores the pixel data on which the second filtering process has been carried out by the second filtering section 508. At a point at which three outer circumferential lines' worth of pixel data are stored in the second buffer memory 510, the third filtering section 512 scans the inside of the image block again by means of the spiral scanning, starting the third filtering process.

The third filtering section 512 carries out the third filtering process using a 5×5 filter matrix (Fi3). In this case, the third filtering section 512, by acquiring adjacent pixel groups utilizing the pixel data exchange section 520 as necessary, carries out the third filtering process. In the case of the first embodiment, as three outer circumferential lines' worth of pixel data are also stored one each in second buffer memories 310, 410, and 610 of the other video processing sections 30, 40, and 60, it is possible to acquire the adjacent pixel groups utilizing the pixel data exchange section 520. For example, in a case of carrying out the third filtering process on the attention pixel f3 (959, 0), the third filtering section 512, utilizing the pixel data exchange section 520, acquires the adjacent pixel groups stored one each in the second buffer memories 310, 410, and 610 of the other video processing sections 30, 40, and 60. Subsequently, the third filtering section 512 carries out the third filtering process on the attention pixel f3 (959, 0).

The second block memory 514 stores one block's worth of pixel data on which the third filtering process has been carried out by the third filtering section 512. On the one block's worth of pixel data being stored in the second block memory 514, pixel data of an image block DOut3 are retrieved using a sequential scanning by the video synthesizing section 70.

The video synthesizing section 70, in accordance with the sequential scanning of the whole of one screen, retrieves image blocks Dout1 to 4 from the four video processing sections 30 to 60, and synthesizes them into image data of one screen. The video output section 80 D/A converts the synthesized image data DOut, and outputs them to the exterior (a monitor or the like) as an output signal.

Next, a description will be given, using FIGS. 6 to 10, of a timing of carrying out the second filtering process on the pixel data stored in the first buffer memory 506, and a memory capacity of the first buffer memory 506. Herein, a description will be given using the first buffer memory 506, but the same applies to a case of carrying out the third filtering process on the pixel data stored in the second buffer memory 510.

Figure 6:
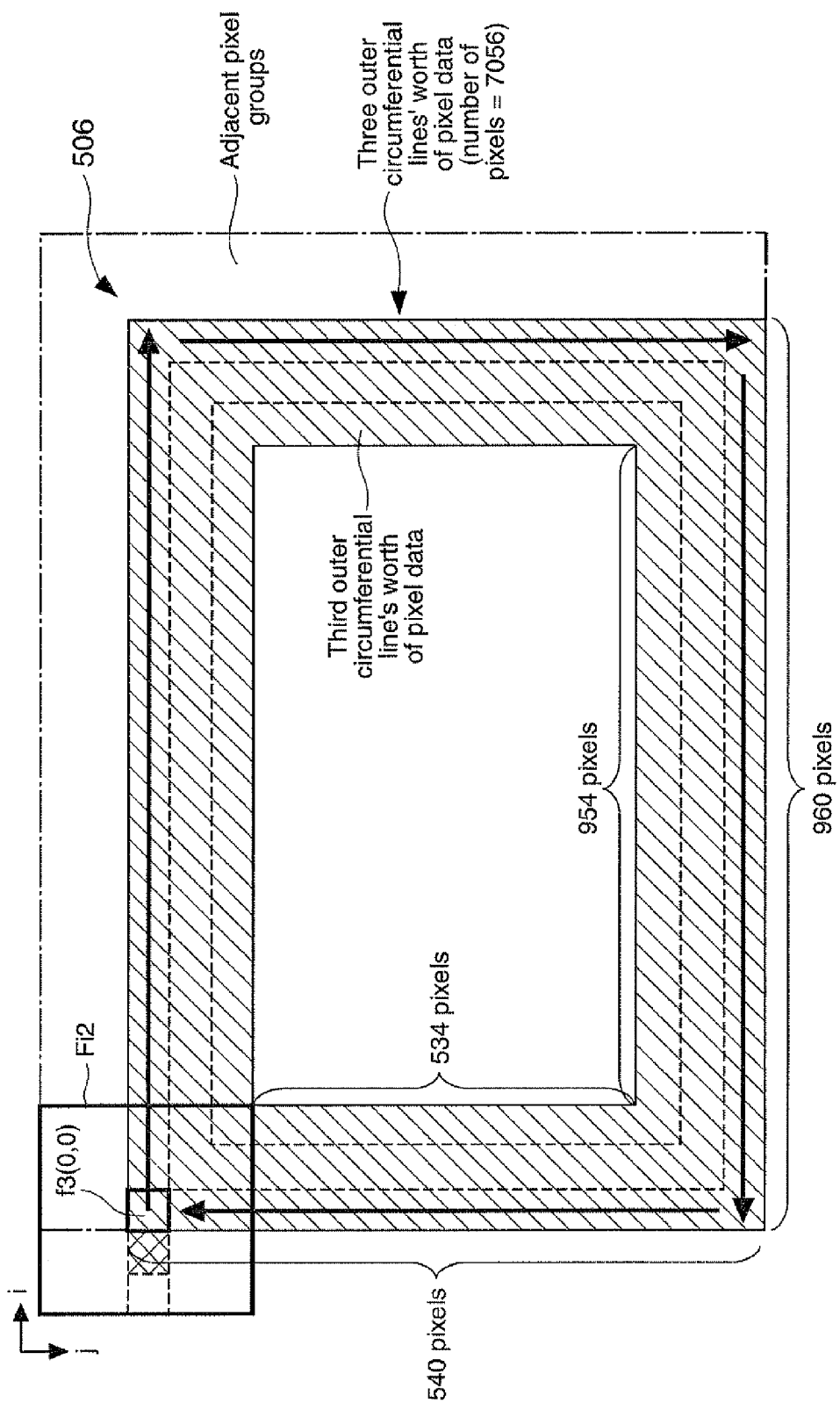
FIG. 6 is a diagram for illustrating a timing of starting a second filtering process on pixel data in a first outer circumferential line, from among pixel data stored in a first buffer memory, and a memory capacity.

FIG. 6 is a diagram for illustrating a timing of starting the second filtering process on pixel data in a first outer circumferential line, among the pixel data stored in the first buffer memory 506, and a memory capacity. Pixel data after the first filtering process are stored in the first buffer memory 506, in order from the outside pixels toward the inside pixels. On the three outer circumferential lines' worth of pixel data being stored in the first buffer memory 506, a scanning is started clockwise from pixel data at coordinates (0, 0), carrying out the second filtering process on the pixel data in the first outer circumferential line. In this case, adjacent pixel groups are acquired utilizing the pixel data exchange section 520 as necessary, carrying out the second filtering process. Also, in the event that an attention pixel is positioned in the vicinity of the outer circumference of the image data configuring one screen, and that one portion of the 25 pixels' worth of pixel data does not exist, the 25 pixels' worth of pixel data are taken to be formed by regarding the nonexistent pixel data as pixel data at adjacent coordinates. For example, pixel data (pixel data in the shaded portion) positioned to the left of the coordinates (0, 0) are taken to be of the same value as the pixel data at the coordinates (0, 0). Furthermore, pixel data positioned to the left of the pixel data in the shaded portion are also similarly taken to be of the same value as the pixel data at the coordinates (0, 0). In FIG. 6, the number of pixels stored in the first buffer memory 506 is 960×540−954×534=7056 pixels.

Figure 7:
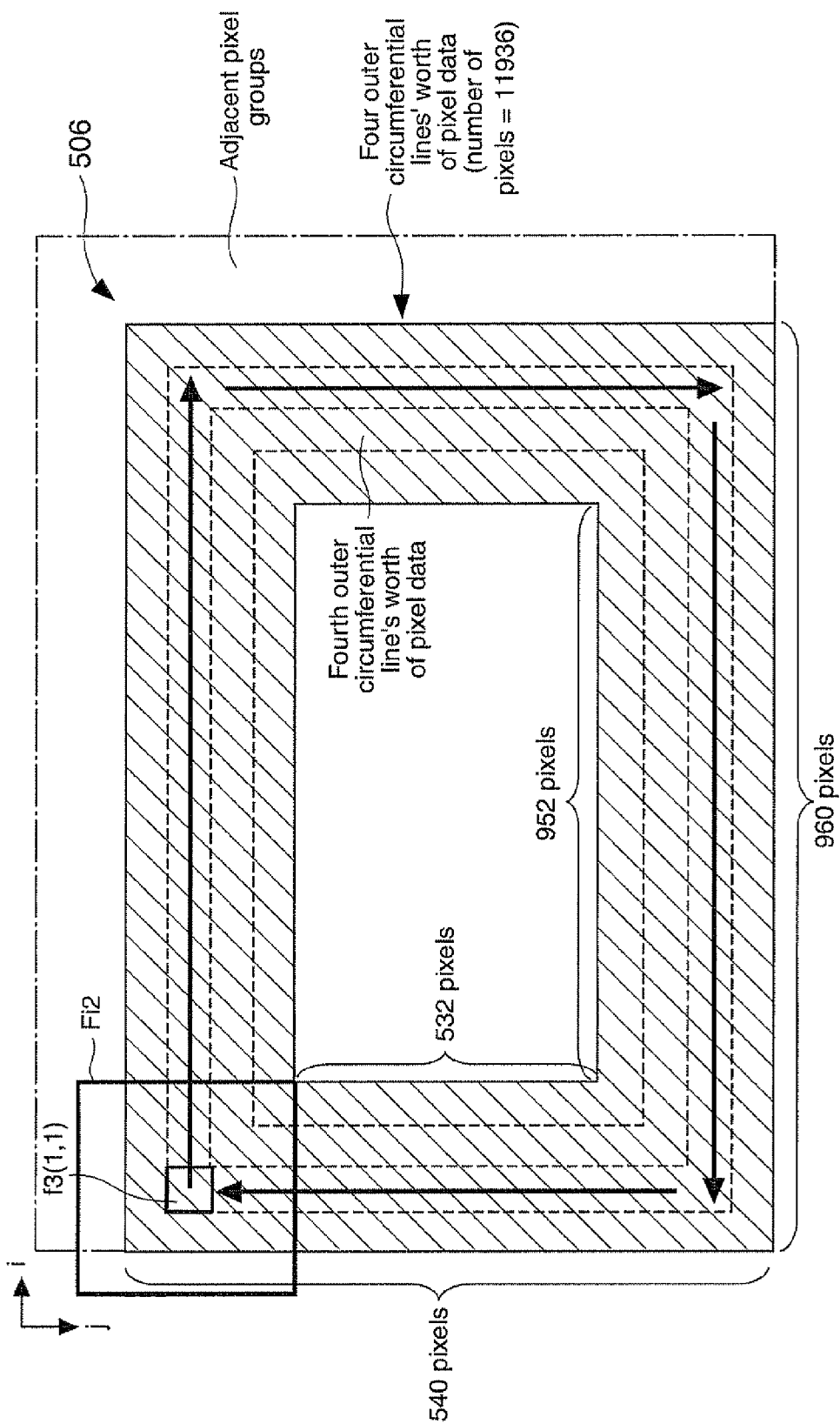
FIG. 7 is a diagram for illustrating a timing of carrying out the second filtering process on pixel data in a second outer circumferential line, from among the pixel data stored in the first buffer memory, and a memory capacity.

FIG. 7 is a diagram for illustrating a timing of carrying out the second filtering process on pixel data in a second outer circumferential line, among the pixel data stored in the first buffer memory 506, and a memory capacity. On pixel data in a fourth outer circumferential line being added to the first buffer memory 506, a scanning is started clockwise from pixel data at coordinates (1, 1), carrying out the second filtering process on the pixel data in the second outer circumferential line stored in the first buffer memory 506. In this case, adjacent pixel groups are acquired utilizing the pixel data exchange section 520 as necessary, carrying out the second filtering process. At this time, the number of pixels stored in the first buffer memory 506 is 960×540−952×532=11936 pixels.

Figure 8:
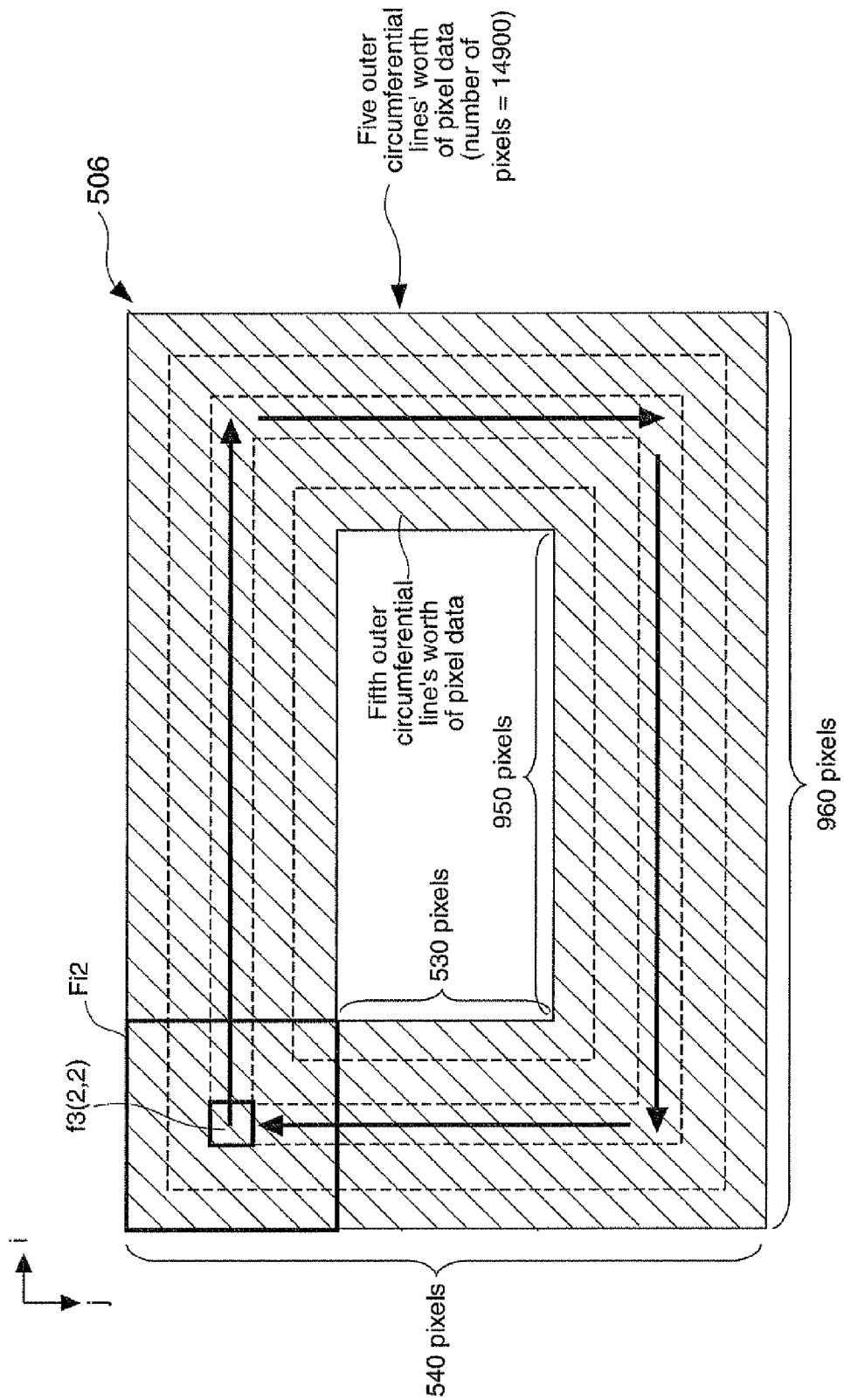
FIG. 8 is a diagram for illustrating a timing of carrying out the second filtering process on pixel data in a third outer circumferential line, from among the pixel data stored in the first buffer memory, and a memory capacity.

FIG. 8 is a diagram for illustrating a timing of carrying out the second filtering process on pixel data in a third outer circumferential line, among the pixel data stored in the first buffer memory 506, and a memory capacity. On pixel data in a fifth outer circumferential line being added to the first buffer memory 506, a scanning is started clockwise from pixel data at coordinates (2, 2), carrying out the second filtering process on the pixel data in the third outer circumferential line stored in the first buffer memory 506. In this case, it not being necessary to acquire adjacent pixel groups at a time of the second filtering process, it is possible to carry out the second filtering process using only five outer circumferential lines' worth of pixel data stored in the first buffer memory 506. At this time, the number of pixels stored in the first buffer memory 506 is 960×540−950×530=14900 pixels.

Figure 9:
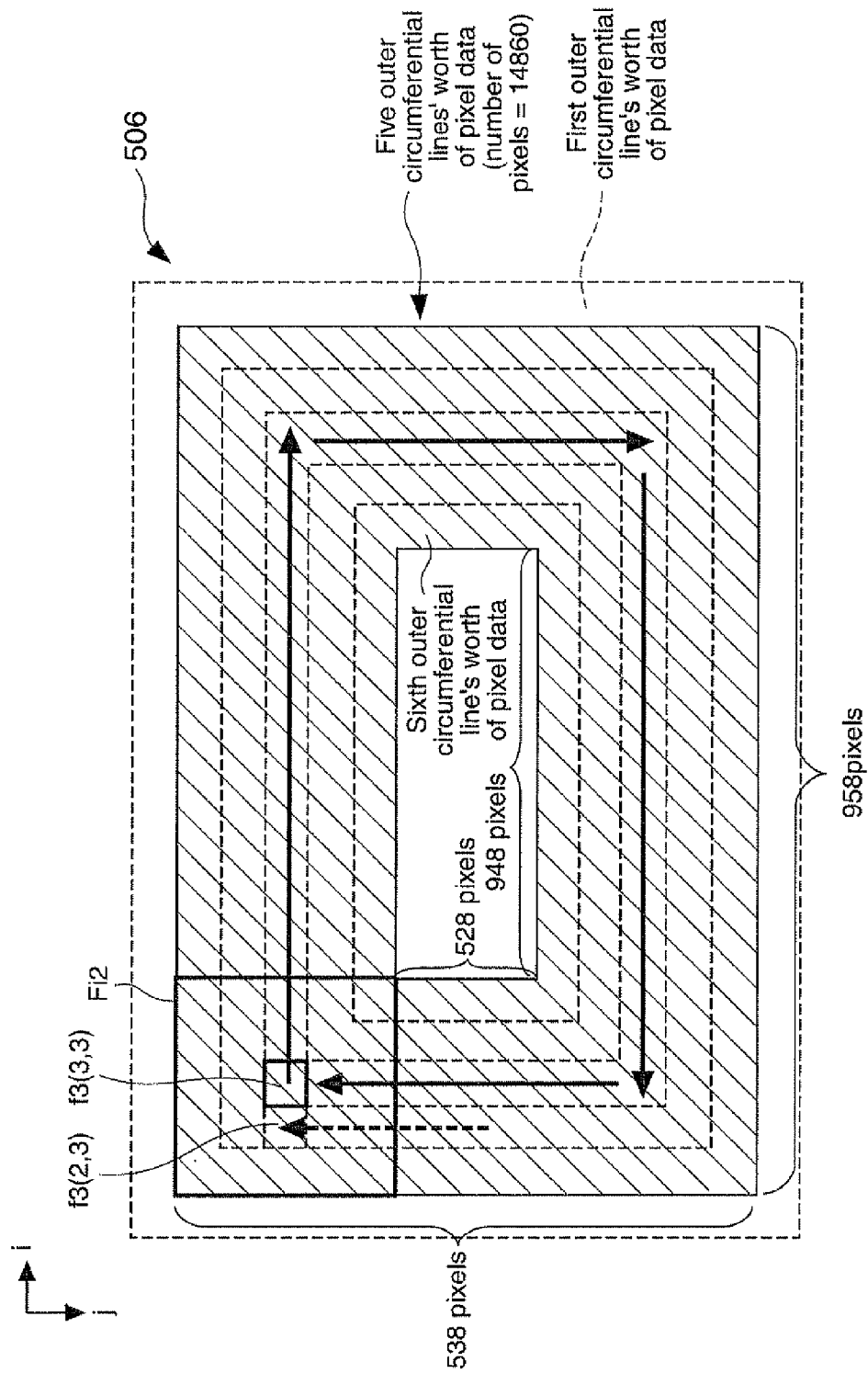
FIG. 9 is a diagram for illustrating a timing of carrying out the second filtering process on pixel data in a fourth outer circumferential line, from among the pixel data stored in the first buffer memory, and a memory capacity.

FIG. 9 is a diagram for illustrating a timing of carrying out the second filtering process on the pixel data in the fourth outer circumferential line, among the pixel data stored in the first buffer memory 506, and a memory capacity. On the second filtering process being carried out on pixel data at coordinates (2, 3) which are final scanned pixels in the third outer circumferential line, the pixel data in the first outer circumferential line are deleted from the first buffer memory 506. After the deletion of the pixel data in the first outer circumferential line, pixel data in a sixth outer circumferential line are added to the first buffer memory 506. Subsequently, a scanning is started clockwise from pixel data at coordinates (3, 3), carrying out the second filtering process on the pixel data in the fourth outer circumferential line. At this time, the number of pixels stored in the first buffer memory 506 is 958×538−948×528=14860 pixels.

Figure 10:
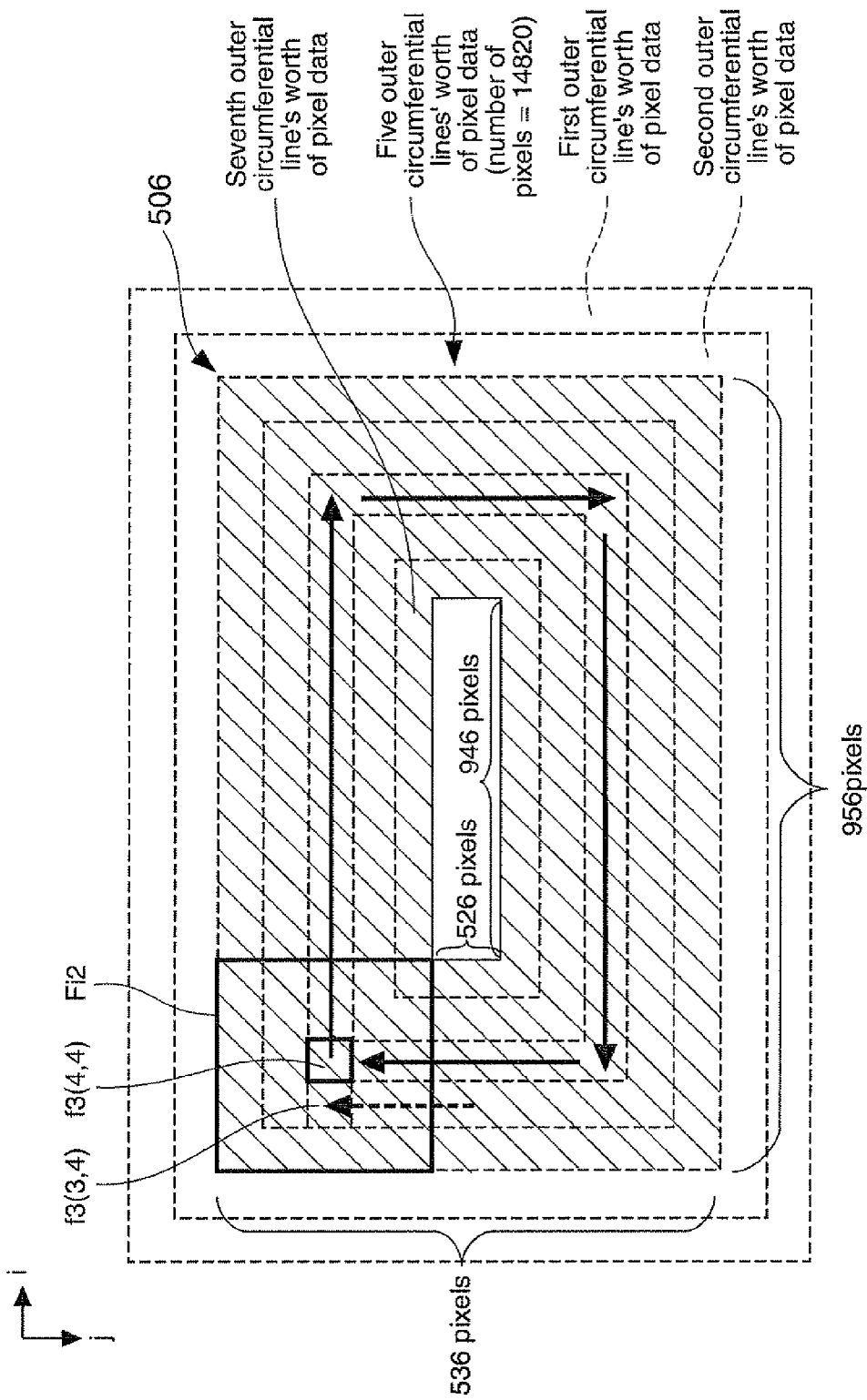
FIG. 10 is a diagram for illustrating a timing of carrying out the second filtering process on pixel data in a fifth outer circumferential line, from among the pixel data stored in the first buffer memory, and a memory capacity.

FIG. 10 is a diagram for illustrating a timing of carrying out the second filtering process on the pixel data in the fifth outer circumferential line, among the pixel data stored in the first buffer memory 506, and a memory capacity of the first buffer memory 506. On the second filtering process being carried out on pixel data at coordinates (3, 4) which are final scanned pixels in the fourth outer circumferential line, the pixel data in the second outer circumferential line are deleted from the first buffer memory 506. After the deletion of the pixel data in the second outer circumferential line, pixel data in a seventh outer circumferential line are added to the first buffer memory 506. Subsequently, a scanning is started clockwise from pixel data at coordinates (4, 4), carrying out the second filtering process on the pixel data in the fifth outer circumferential line. At this time, the number of pixels stored in the first buffer memory 506 is 956×536−946×526=14820 pixels.

The heretofore described procedures are continued until the second filtering process is carried out on all pixels in the image block DIn3. As can be understood from FIGS. 6 to 10, a memory capacity necessary for a buffer memory is 14900 pixels, which is about 3% of a memory capacity (960×540=518400 pixels) required to store one block's worth of pixel data. Also, it is possible to start a filtering process in the subsequent stage before the one block's worth of pixel data are stored in the buffer memory.

From the viewpoint of a reduction in memory capacity, in the heretofore described first embodiment, a procedure has been employed according to which pixel data no longer required for a filtering process are deleted from and required pixel data are added to, the first buffer memory 506. However, it may be possible to add required pixel data while storing pixel data no longer required for a filtering process. That is, it is acceptable that each buffer memory has a capacity which can store one block's worth of pixel data. This is because, in this way too, it is possible, by using the spiral scanning, to start the filtering process in the subsequent stage before the one block's worth of pixel data are stored in the buffer memory.

In order to make advantages of the first embodiment clearer, a description will be given of a comparison example in which attention pixels are selected by the sequential scanning. A configuration of the comparison example, to be described hereafter, includes three image quality adjustment sections in the same way as in the first embodiment, and any image quality adjustment section is a filtering section.

A-2. Comparison Example

Figure 11:
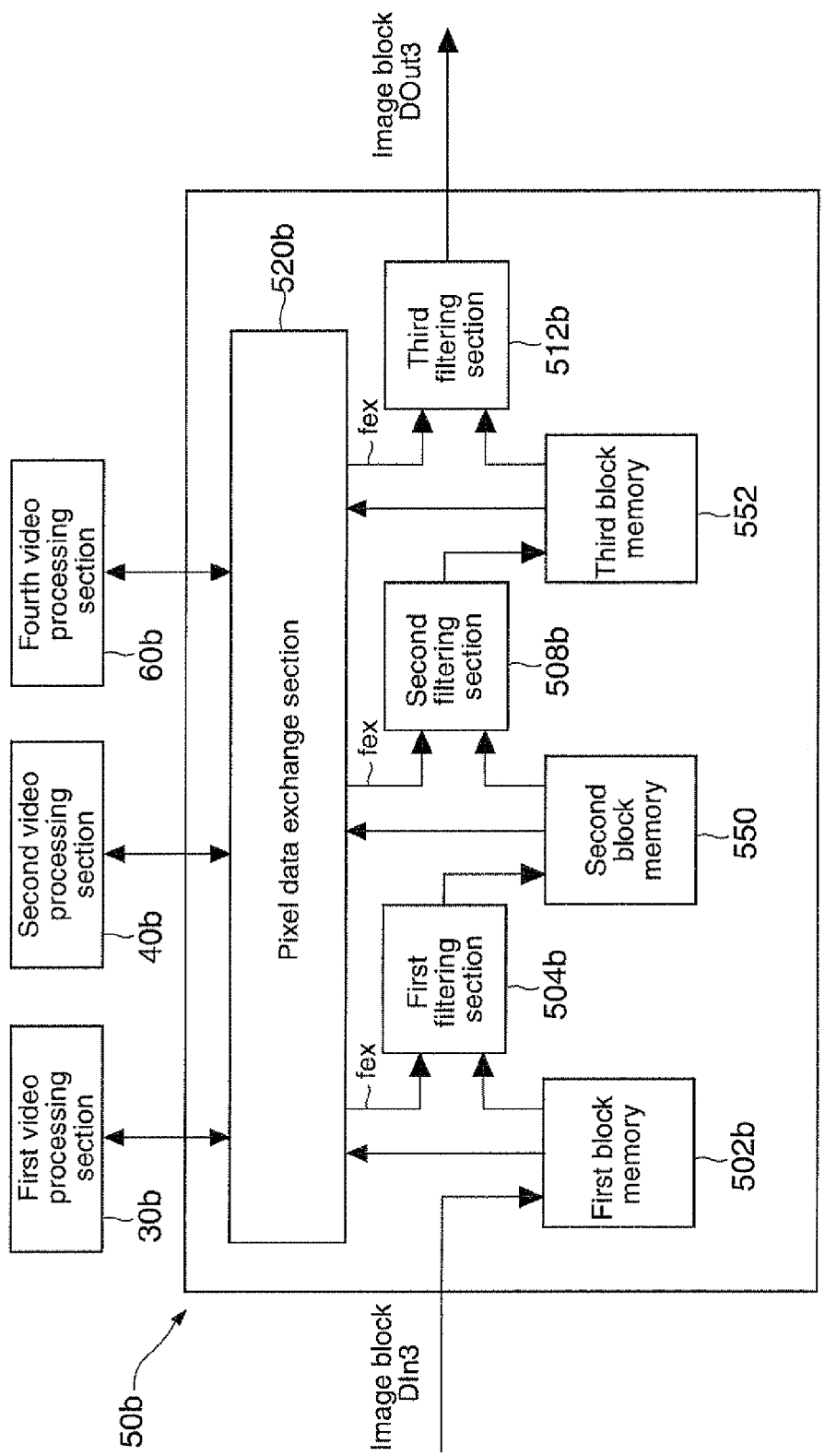
FIG. 11 is a block diagram showing an internal configuration of a third video processing section in a comparison example.

FIG. 11 is a block diagram showing an internal configuration of a third video processing section 50b in the comparison example. A difference from the heretofore described first embodiment is that each filtering section selects an attention pixel from a memory, disposed in the stage previous to each filtering section, by means of the sequential scanning. Because of this, a difference in configuration from the heretofore described embodiment (refer to FIG. 2) is that a second block memory 550 is used in place of the first buffer memory 506, a third block memory 552 is used in place of the second buffer memory 510, and no block memory is provided in the stage subsequent to a third filtering section 512b. A video input section 10, a video division section 20, a video synthesizing section 70, and a video output section 80, are of the same configuration as those of the heretofore described first embodiment (refer to FIG. 1).

Figure 12:
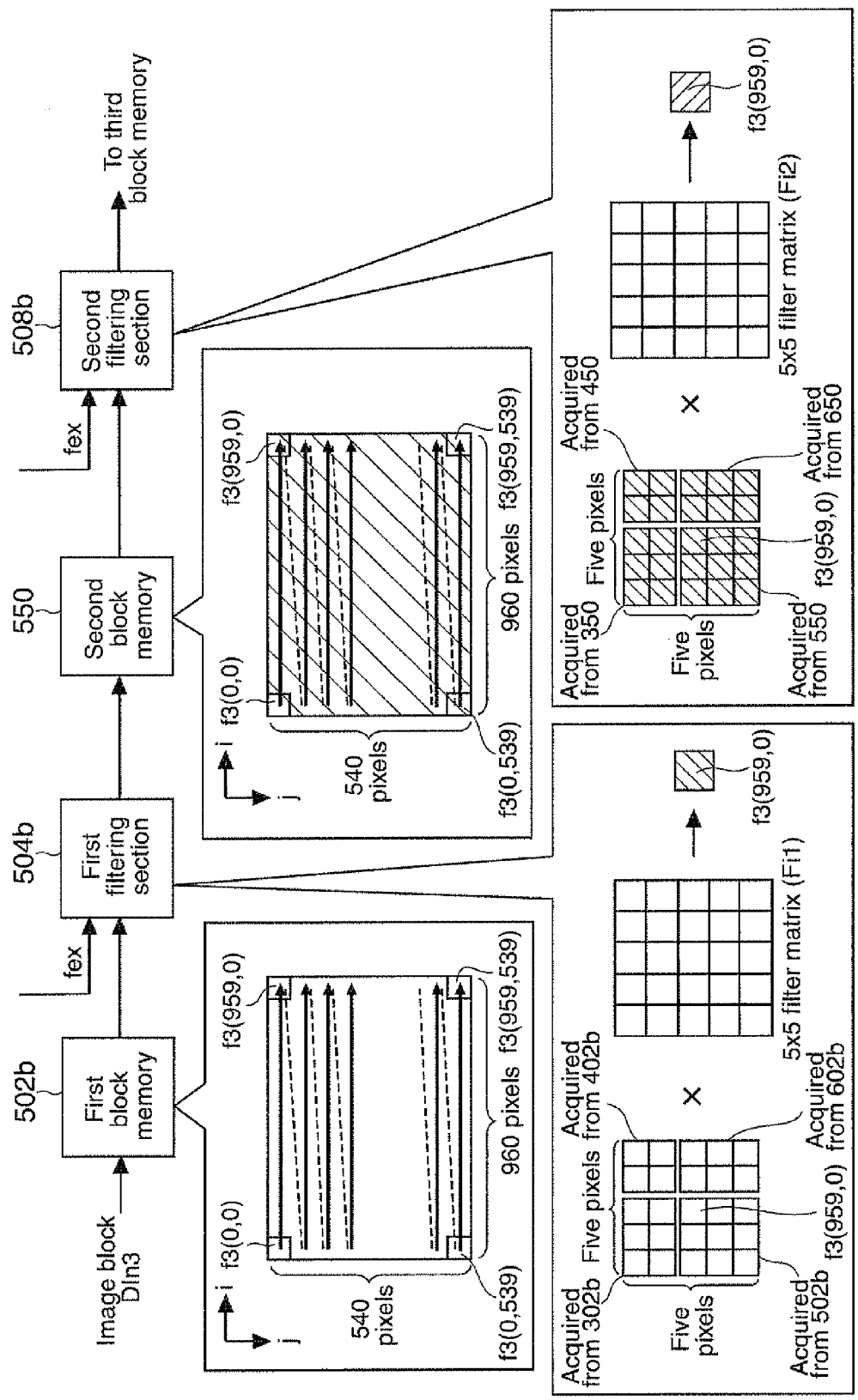
FIG. 12 is a diagram showing processing details of a first block memory to second filtering section of the comparison example.

FIG. 12 is a diagram showing processing details of a first block memory 502b to second filtering section 508b of the comparison example. Herein, a description will be given taking processing details of the third video processing section 50b as an example, but the same processing is carried out in other video processing sections 30b, 40b, and 60b too. Firstly, the first block memory 502b stores an image block DIn3, among four blocks divided by the video division section 20 in the previous stage, which is configured of 960 pixels in the horizontal direction and 540 pixels in the vertical direction.

A first filtering section 504b selects an attention pixel by means of the sequential scanning, and carries out a first filtering process using a 5×5 filter matrix (Fi1). In this case, the first filtering section 504b acquires adjacent pixel groups utilizing a pixel data exchange section 520b as necessary. The same applies to the other filtering sections.

On one block's worth of pixel data, that is, data equivalent to a total of 518400 pixels, 960 pixels in the horizontal direction by 540 pixels in the vertical direction, being stored in the second block memory 550, the second filtering section 508b selects an attention pixel by means of the sequential scanning, carrying out a second filtering process. A reason for storing the one block's worth of pixel data in the second block memory 550, unlike the first embodiment, will be described hereafter. The second filtering section 508b carries out the second filtering process using a 5×5 filter matrix (Fi2), and stores a result thereof in the third block memory 552.

Figure 13:
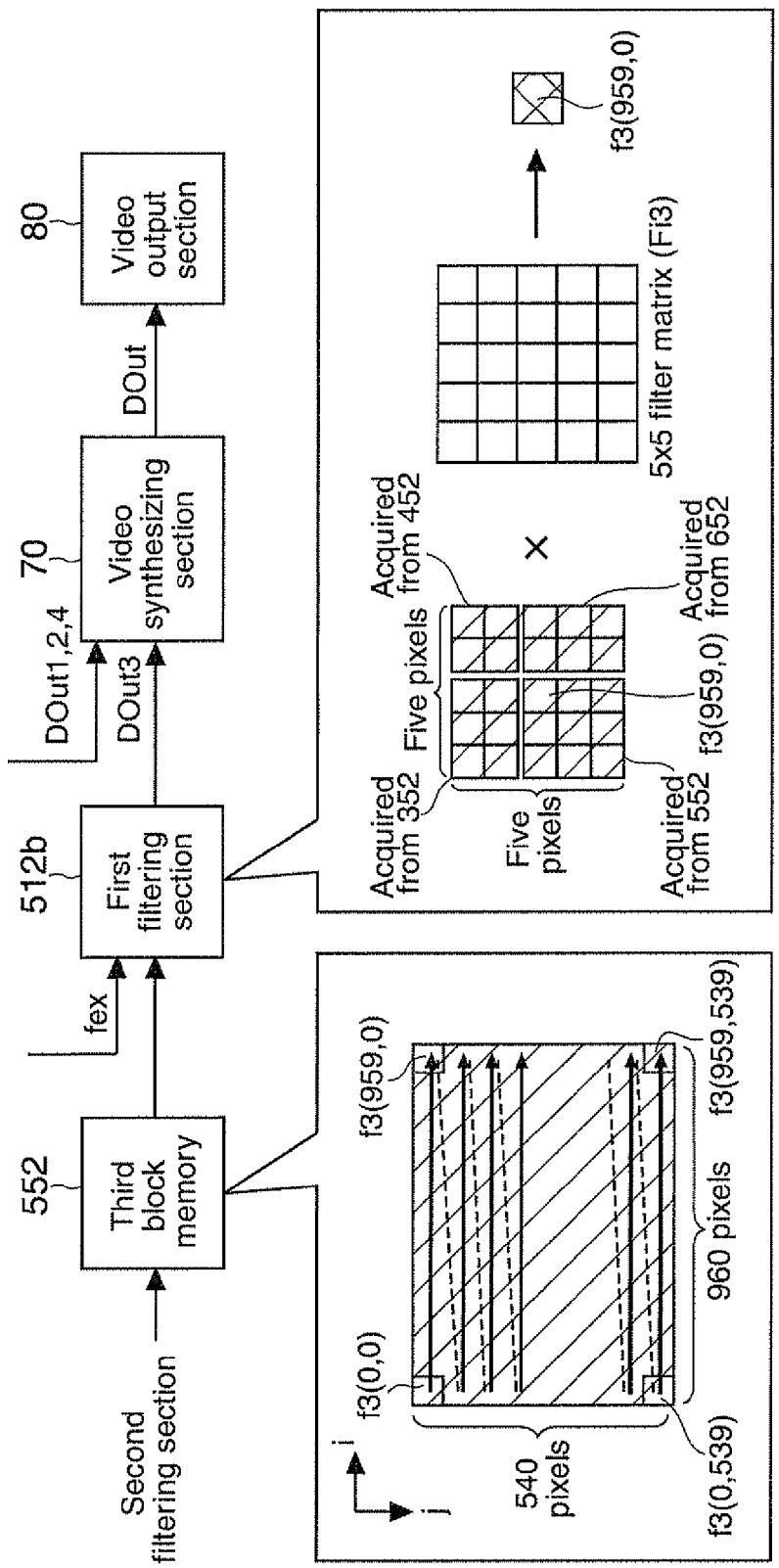
FIG. 13 is a diagram showing processing details of a third block memory to video output section of the comparison example.

FIG. 13 is a diagram showing processing details of the third block memory 552 to video output section 80 of the comparison example. On the one block's pixel data being stored in the third block memory 552, the third filtering section 512b selects an attention pixel by means of the sequential scanning, carrying out the third filtering process using the 5×5 filter matrix (F13).

The video synthesizing section 70, in accordance with the sequential scanning of the whole of one screen, retrieves image blocks DOuti to 4 sent from four video processing sections 30b to 60b, and synthesizes them into image data of one screen. Also, the video output section 80 D/A converts synthesized image data DOut, and outputs them to the exterior (a monitor or the like) as an output signal.

Figure 14:
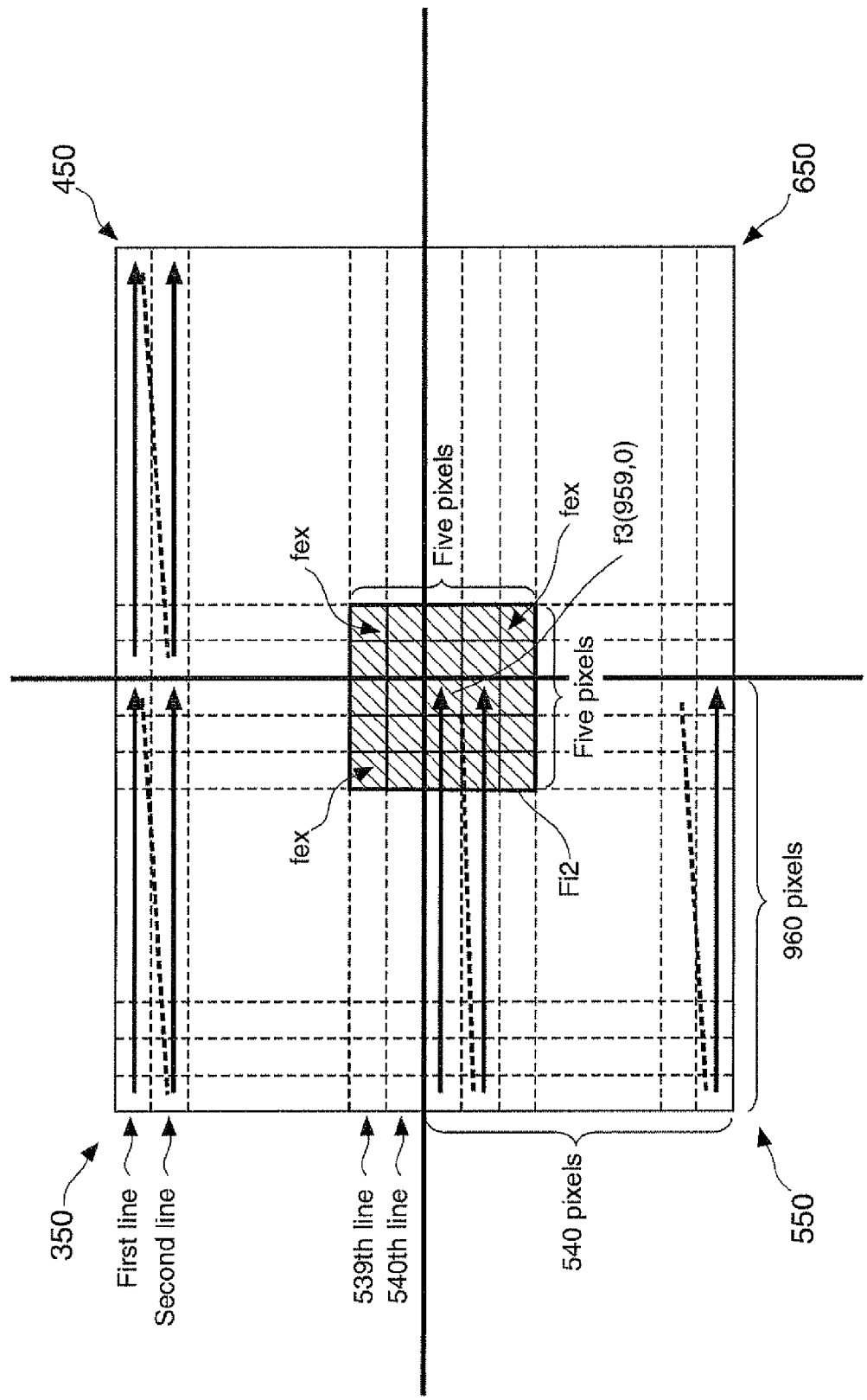
FIG. 14 is a diagram for illustrating a reason for storing one block's worth of pixel data in a second block memory, and the third block memory, of the comparison example.

FIG. 14 is a diagram for illustrating a reason for storing the one block's worth of pixel data in the second block memory 550 and third block memory 552. Herein, a description will be given taking the second block memory 550 as an example, but the same applies to the third block memory 552. Pixel data on which the first filtering process has been carried out using the sequential scanning by the first filtering section disposed in the previous stage are stored in each of the second block memories 350, 450, 550, and 650 of the respective video processing sections 30b, 40b, 50b, and 60b. Herein, in a case of carrying out the second filtering process on pixel data at coordinates (959, 0) which are pixel data in a first line of the second block memory 550, 25 pixels' worth of pixel data in the area marked with diagonal lines shown in FIG. 14 are required. In order to acquire adjacent pixel groups (fex), it is necessary for the pixel data in the area marked with diagonal lines to be stored in the second block memory 350 of the first video processing section 30b, and the second block memory 450 of the second video processing section 40b, at a point at which the second filtering process is carried out on the pixel data at the coordinates (959, 0). Consequently, it is necessary for one block's worth of pixel data to be stored in the second block memory 350 of the first video processing section 30b, and the second block memory 450 of the second video processing section 40b. For the above reason, in the case of selecting an attention pixel by means of the sequential scanning, and carrying out the filtering process, it is necessary to store one block's worth of pixel data in the block memory.

A-3. Advantages of First Embodiment

In the comparison example, unless one block's worth of pixel data are stored in the block memory, it is not possible to start a filtering process in a filtering section disposed in the stage subsequent to the block memory. Therefore, as each filtering section waits to process until a processing by a filtering section in the previous stage is completed, a delay occurs. As opposed to this, in the embodiment, in the event that three outer circumferential lines' worth of pixel data are stored in each buffer memory disposed in the stage previous to each filtering section, it is possible to start a filtering process with a filtering section disposed in the stage subsequent to each buffer memory. Therefore, with the first embodiment, it being possible to process image data at a higher speed, it is possible to output an input video to the exterior as an output video nearer to real time than with the comparison example.

For this reason, the larger the number of filtering processes in a video processing section, the greater the difference occurring between the speed of processing by the sequential scanning employed in the comparison example, and the speed of processing by the spiral scanning employed in the first embodiment, this results in a striking effect on the speed of processing by the spiral scanning.

The third video processing section 50b of the comparison example requires a memory capacity such that 518400 pixels' (540 pixels vertically by 960 pixels horizontally) worth of pixel data can be stored in each of the first block memory 502b, second block memory 550, and third block memory 552. Consequently, the video processing sections of the comparison example require a 518400×3 (the number of block memories)×4 (the number of video processing sections) =8294400 pixels' worth of memory capacity. As opposed to this, it is sufficient that the third video processing section 50 of the first embodiment has a memory capacity such that each of the first block memory 502 and second block memory 514 can store 518400 pixels' (540 pixels vertically by 960 pixels horizontally) worth of pixel data, and each of the first buffer memory 506 and second buffer memory 510 can store 14900 pixels' worth of pixel data. Therefore, the video processing sections of the first embodiment can do with a (518400×2+ 14900×2)×4 (the number of video processing sections) =4266400 pixels' worth of memory capacity.

As above, with the video processing sections of the first embodiment which carry out the spiral scanning, it is possible to reduce a 8294400−4266400=4028000 pixels' worth of memory capacity in comparison with the video processing sections of the comparison example which carry out the sequential scanning. Therefore, the larger the number of pixels of image data configuring one screen, the more it is possible to reduce the memory capacity of the video processing sections using the spiral scanning than using the sequential scanning.

Also, in each video processing section, the larger the number of filtering sections disposed in second and subsequent image quality adjustment sections, the more it is possible to reduce the memory capacity of the video processing sections using the spiral scanning than using the sequential scanning. Therefore, from the viewpoint of reducing the memory capacity, it being sufficient that two or more filtering sections are disposed in the second and subsequent image quality adjustment sections of each video processing section, it is more preferable that, preferably, five or more are disposed, and it is still more preferable that ten or more are disposed. The reason for making the number of filtering sections in the second and subsequent image quality adjustment sections two or more is that, in a case of one, it is sufficient that, with the sequential scanning, two block memories, each of which stores one block's worth of pixel data, are disposed in each video processing section. As opposed to this, the reason is that, with the spiral scanning, is necessary to dispose two block memories, each of which stores one block's worth of pixel data, and one buffer memory which stores several outer circumferential lines' worth (in the case of the 5×5 filtering process, three outer circumferential lines' worth) of pixel data, in each video processing section, and that the spiral scanning requires more memory capacity than the sequential scanning.

B. Second Embodiment

Figure 15:
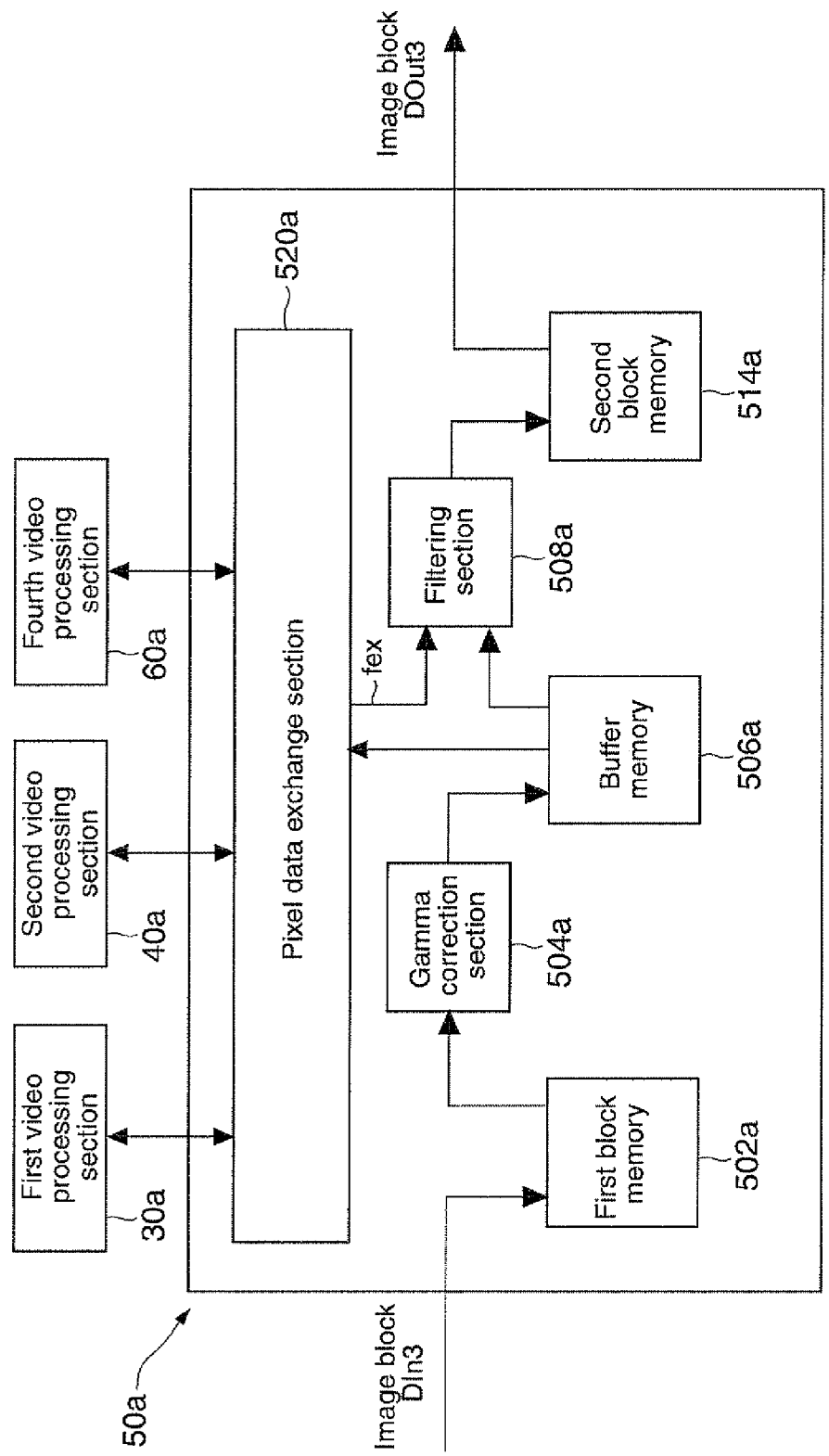
FIG. 15 is a block diagram showing an internal configuration of a third video processing section of a second embodiment.

FIG. 15 is a block diagram showing an internal configuration of a third video processing section 50a of a second embodiment. A difference from the first embodiment is that the three image quality adjustment sections are replaced with two, and that the first image quality adjustment section is replaced with a gamma correction section 504a which carries out a gamma correction. A video input section 10, a video division section 20, a video synthesizing section 70, and a video output section 80 are of the same configuration as those of the first embodiment (refer to FIG. 1). Furthermore, with a method of selecting an attention pixel too, in the same way as in the first embodiment, the selection is carried out by the spiral scanning.

Figure 16:
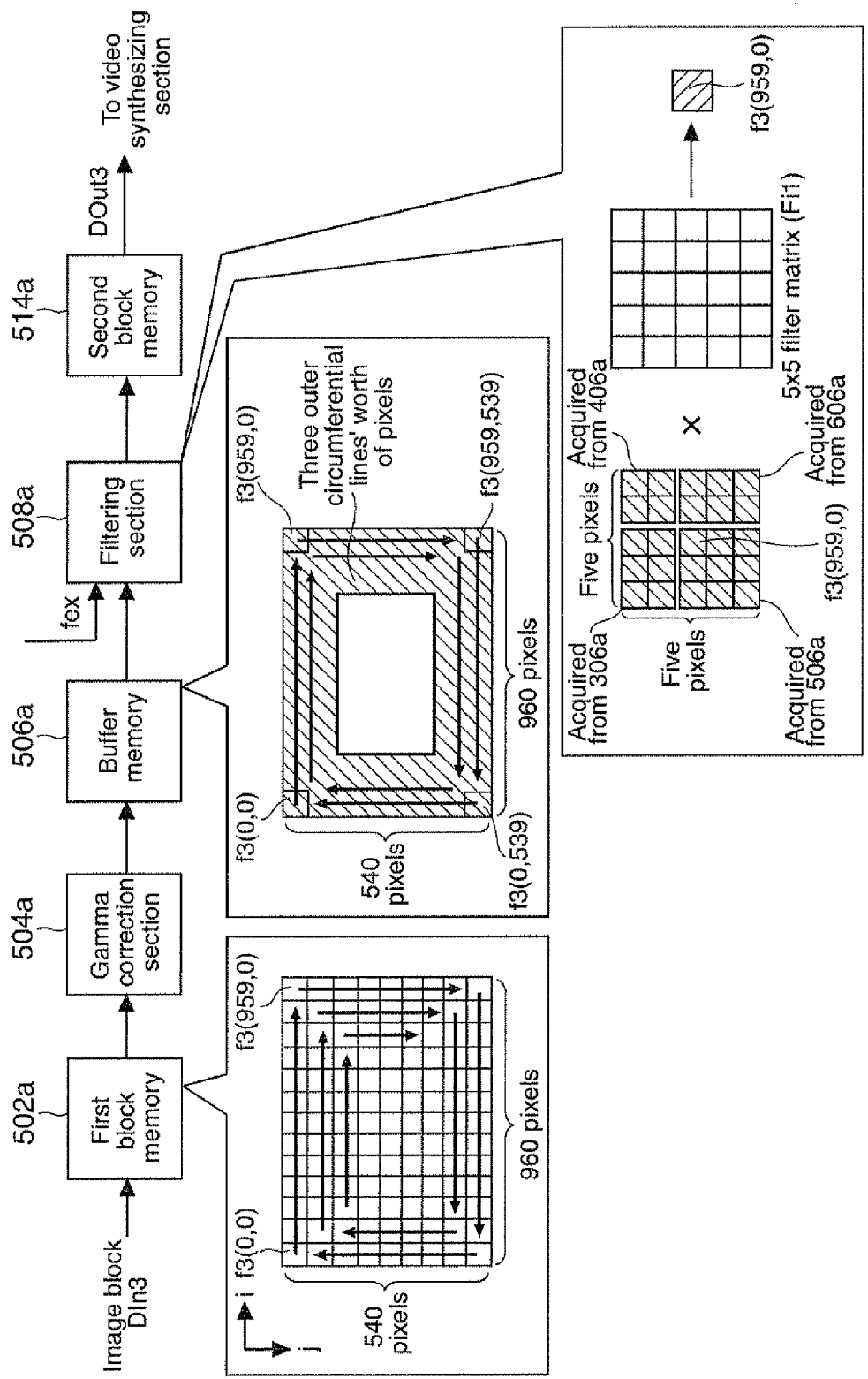
FIG. 16 is a diagram showing processing details of a first block memory to second block memory of the second embodiment.

FIG. 16 is a diagram showing processing details of a first block memory 502a to second block memory 514a of the second embodiment. An image block DIn3 divided by the video division section in the previous stage is stored in the first block memory 502a. On one block's worth of pixel data being stored in the first block memory 502a, a gamma correction section 504a scans the inside of the image block by means of the spiral scanning, selects a pixel to be subjected to a gamma correction process from the first block memory 502a, and carries out the gamma correction. In this case, with the gamma correction, as the process is carried out in units of one pixel, there is no need to acquire adjacent pixel groups.

A buffer memory 506a stores pixel data on which the gamma correction has been carried out by the gamma correction section 504a. In the same way as in the first embodiment, at a point at which three outer circumferential lines' worth of pixel data are stored in the buffer memory 506a, a filtering section 508a scans the inside of the image block by means of the spiral scanning, and carries out a filtering process using a 5×5 filter matrix (Fi1). The second block memory 514a stores the pixel data on which the filtering process has been carried out by the filtering section 508a. On one block's worth of pixel data being stored in the second block memory 514a, an image block DOut3 is retrieved using the sequential scanning by the video synthesizing section in the subsequent stage. As above, it is possible to start a filtering process in the subsequent stage before one block's worth of pixel data are stored in the buffer memory 506a.

In this way, in the second embodiment, it is possible to start a filtering process in the filtering section 508a in the subsequent stage, provided that the three outer circumferential lines' worth of pixel data are stored in the buffer memory 506a disposed in the stage previous to the filtering section 508a. Therefore, it is possible to process image data at a higher speed by selecting an attention pixel by means of the spiral scanning than by selecting an attention pixel by means of the sequential scanning. For this reason, the larger the number of second and subsequent filtering sections disposed in the video processing section, the greater the difference occurs between the speed of processing by the sequential scanning and the speed of processing by the spiral scanning employed in the second embodiment. It is sufficient that one or more filtering sections are disposed in the second and subsequent image quality adjustment sections in each video processing section, but it is more preferable that two or more are disposed. This is because, in the event that two or more are disposed, it is also possible to achieve the reduction in memory capacity, as described in the first embodiment, in addition to an increase in processing speed.

C. Modification Examples

The invention, not being limited to the heretofore described embodiments, can be implemented in various forms without departing from the scope thereof and, for example, the following kinds of modification are also possible.

C-1. First Modification Example

Figure 17:
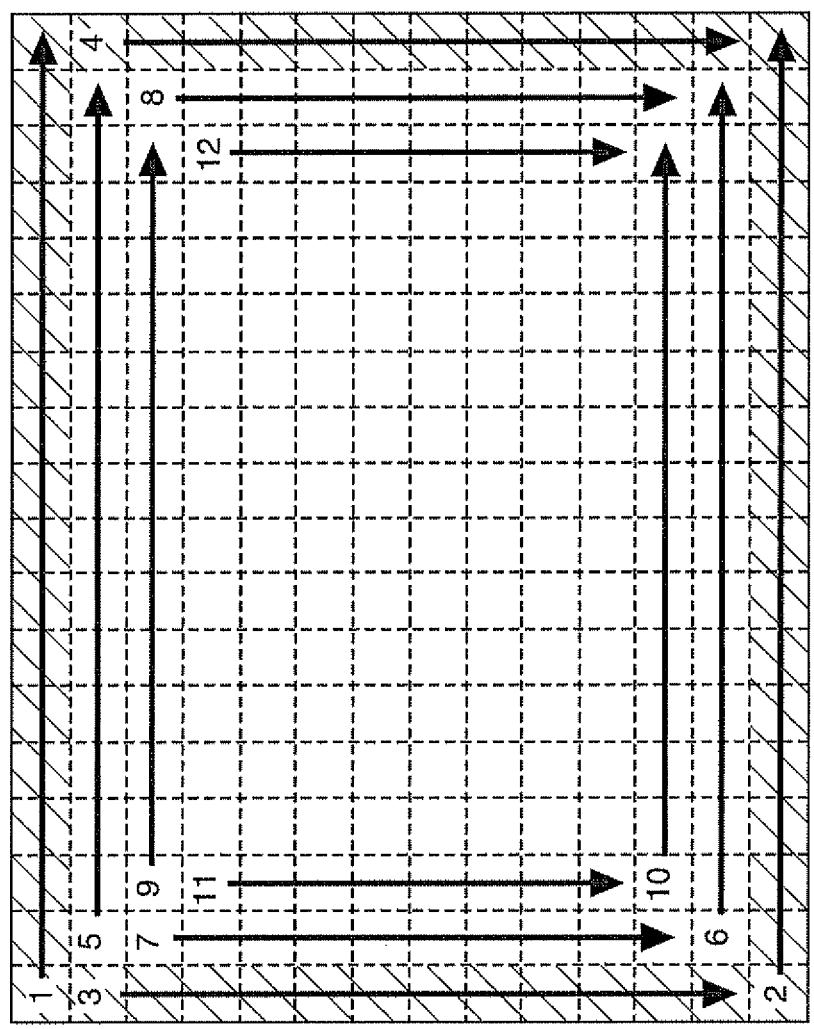
FIG. 17 is a diagram showing an attention pixel selection procedure of a first modification example.

FIG. 17 is a diagram showing an attention pixel selection procedure of a first modification example. Herein, a description will be given taking as an example a procedure of selecting an attention pixel in a first outer circumferential line marked with diagonal lines. Firstly, pixels in the horizontal line positioned at the top (pixels disposed in the position of the arrow given number "1" shown in FIG. 17) are scanned, and next, pixels in the horizontal line positioned at the bottom (pixels disposed in the position of the arrow given number "2" shown in FIG. 17) are scanned. Continuing, pixels in the vertical line positioned at the left (pixels disposed in the position of the arrow given number "3" shown in FIG. 17) are scanned, and finally, pixels in the vertical line positioned at the right (pixels disposed in the position with the arrow given number "4" shown in FIG. 17) are scanned. The heretofore described scanning procedure is carried out in numerical order (numbers 1, 2, 3, 4, 5), and the scanning is carried out on all pixels stored in the memories until the selection. Also, another method can also be employed provided that it is a scanning method which retrieves the pixels stored in the memories, in order from pixels positioned outside toward pixels positioned inside.

C-2. Second Modification Example

Figure 18:
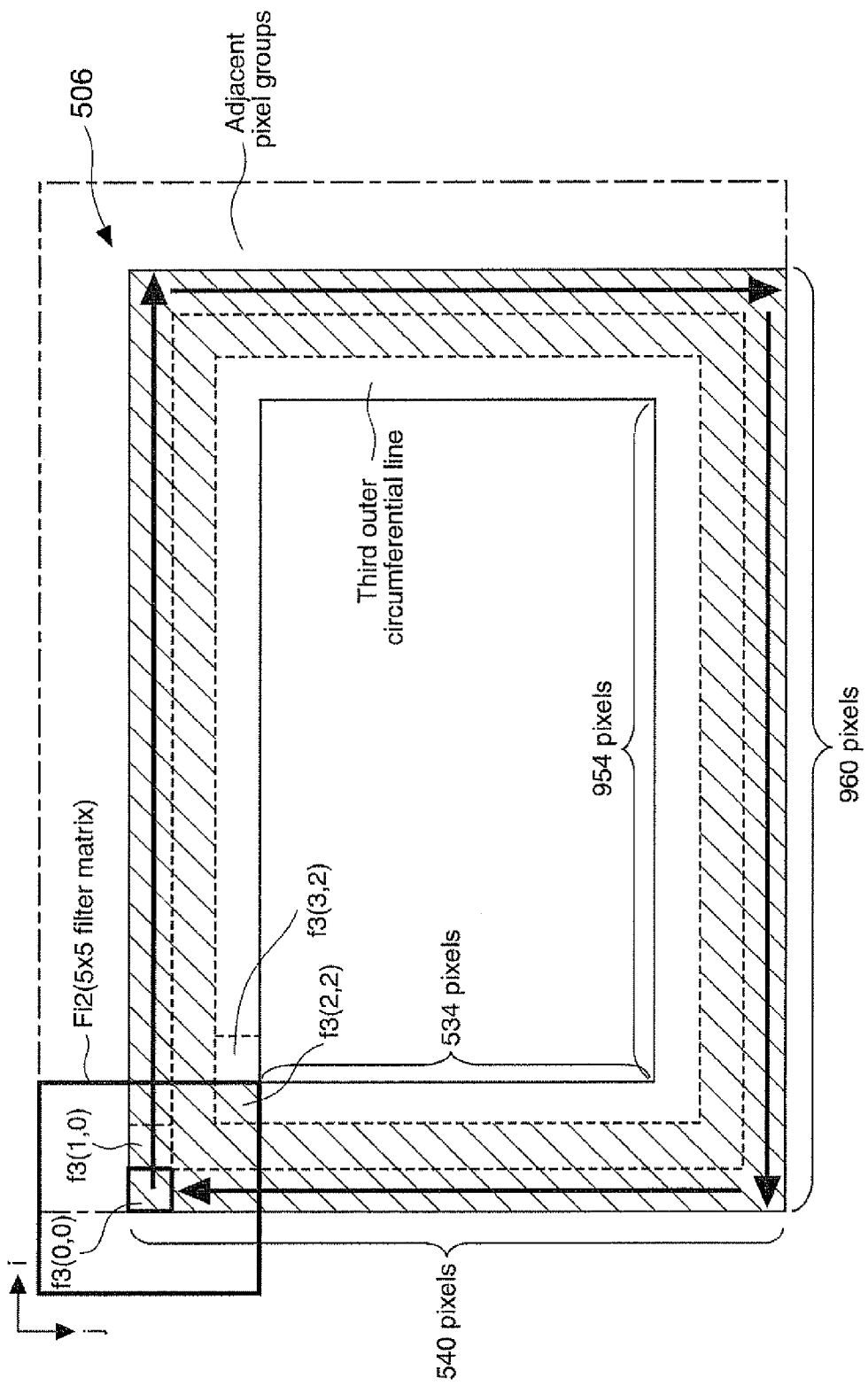
FIG. 18 is a diagram for illustrating a timing of carrying out a second filtering process of a second modification example.

FIG. 18 is a diagram for illustrating a timing of carrying out a second filtering process of a second modification example. As shown in FIG. 18, on an upper left pixel f3 (2, 2) in a third outer circumferential line being stored in the first buffer memory 506, it is possible to carry out a filtering process on an upper left pixel f3 (0, 0) in a first outer circumferential line by means of a 5×5 filter matrix. Therefore, it is acceptable that, at a point at which the upper left pixel f3 (2, 2) in the third outer circumferential line is stored in the first buffer memory 506, a scanning is started clockwise from the pixel f3 (0, 0), carrying out a second filtering process on pixels in the first outer circumferential line. By this means, it is possible to further increase the image data processing speed. In this case, it is necessary for a pixel f3 (3, 2) to have been added to the first buffer memory 506 by the time a filtering process is carried out on a pixel f3 (1, 0).

C-3. Third Modification Example

Figure 19A:
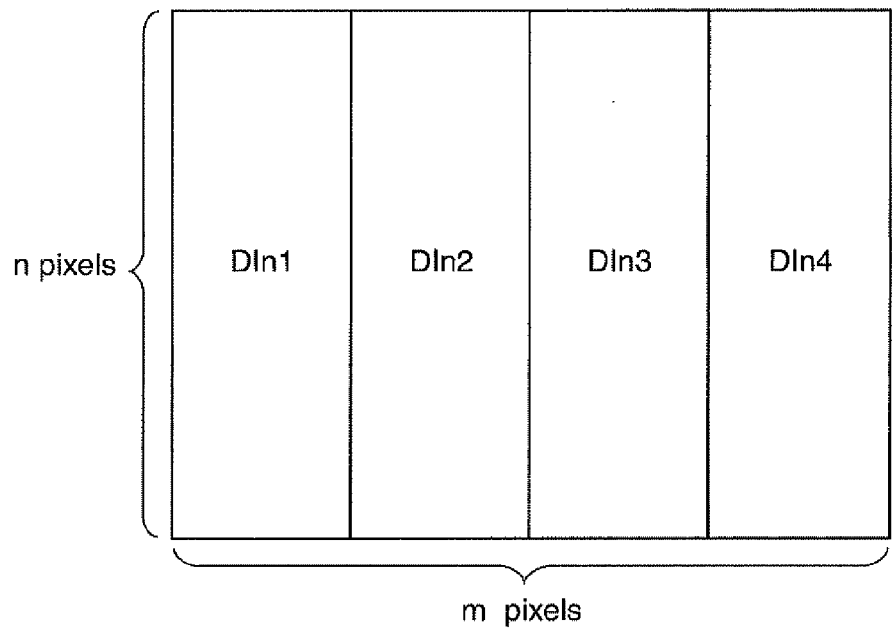
FIGS. 19A and 19B are diagrams for illustrating an image data division method as a third modification example.
Figure 19B:
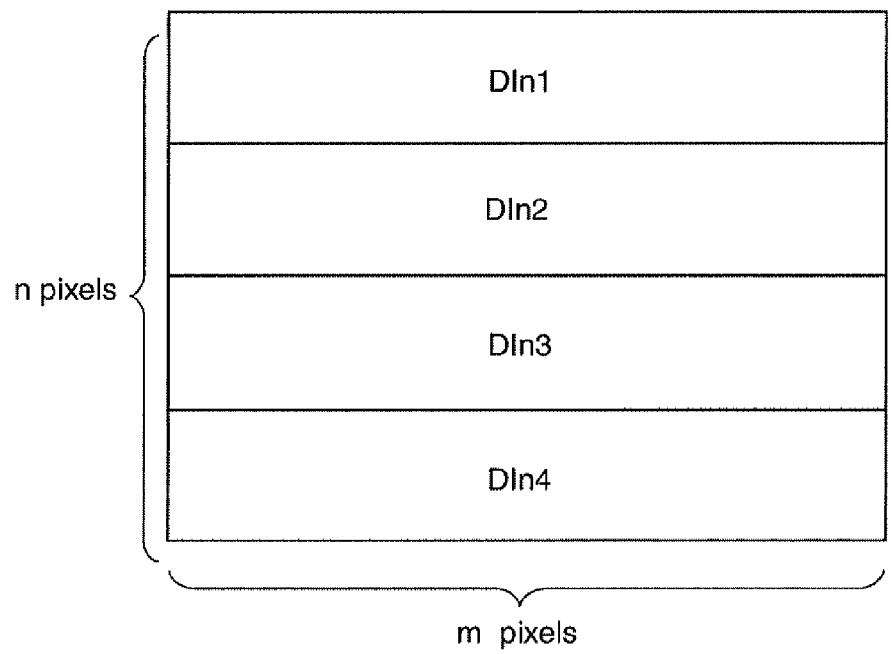

FIGS. 19A and 19B are diagrams for illustrating a method of dividing image data as a third modification example. In the heretofore described embodiments, the image data configuring one screen are divided in a grid pattern, but it is possible either to divide in the vertical direction, as in FIG. 19A, or to divide in the horizontal direction, as in FIG. 19B.

C-4. Fourth Modification Example

In the heretofore described embodiments, the image data configuring one screen are divided into four blocks by the image division section 20 but, the number of blocks into which the data are divided not being limited to four, it is possible to set an optional number which is two or more. In this case, the number of video processing sections equivalent to the number of image blocks into which the data are divided are provided in the stages subsequent to the image division sections, carrying out image quality adjustments in parallel.

C-5. Fifth Modification Example

In the heretofore described embodiments, the invention is used in a high definition television, but the invention can be used in any image display apparatus which includes image display section. For example, it is possible to use the invention in a projector, plasma display panel television, or other image display apparatus.

C-6. Sixth Modification Example

In the heretofore described embodiments, a description has been given taking as an example a high definition television of which one screen has 1920 pixels in the horizontal direction and 1080 pixels in the vertical direction, but the number of pixels on one screen is not limited to this. Also, it is possible to use the invention in each kind of instrument, such as a monitor, which divides a video signal input from an imaging element, such as a CCD imaging element, into a plurality of blocks, carries out a filtering process on them, and outputs them to the exterior as output signals. It is possible to use the invention in, for example, a video camera, a digital camera, or a television telephone. In particular, with the image processing apparatus and image processing method of the invention, as it is possible to carry out a processing of image data at a higher speed in comparison with a case of selecting pixels by means of the sequential scanning, and carrying out a filtering process on them, it is preferable to use the invention in a two-way moving image communication of a television telephone, or the like, of which a real-time property is required.

C-7. Seventh Modification Example

In the heretofore described embodiments, a filtering process is carried out using the 5×5 filter matrix, but it is possible to carry out a filtering process using an optional size of filter matrix, such as a 3×3 filter matrix.

The entire disclosure of Japanese Patent Application No. 2009-003100, filed Jan. 9, 2009 is expressly incorporated by reference herein.

What is claimed is:
1. An image processing apparatus comprising:
an image division section which divides input image data configuring one screen into N (N is an integer of 2 or more) image blocks; and
N image processing sections which carry out image processings in parallel on every N image blocks,
an ith (i is an integer of 1 to N) image processing section including:
a first image block memory which stores the whole of an ith image block divided by the image division section;
K (K is an integer of 2 or more) image quality adjustment sections which sequentially carry out image quality adjustments in series on pixel data of the image block;
(K−1) buffer memories which, being disposed one between two of the K image quality adjustment sections, store at least one portion of the image block after the image quality adjustment;
a second image block memory which, being disposed in the stage subsequent to a Kth image quality adjustment section, stores the whole of the image block after the image quality adjustment; and
a pixel data acquisition section which acquires pixel data in adjacent image blocks, as necessary, from another image processing section, wherein
each image quality adjustment section selects processing subject pixels, in order from pixels positioned outside toward pixels positioned inside the ith image block, and carries out the image quality adjustment, and
at least one of the second to Kth image quality adjustment sections is a filtering section which carries out a filtering process.
2. The image processing apparatus according to claim 1, wherein
K is an integer of 3 or more,
at least two of the second to Kth image quality adjustment sections are filtering sections which carry out the filtering process, and
the memory capacity of each of buffer memories disposed in the stages previous to the filtering sections is smaller than the memory capacity of each of the first image block memory and second image block memory.

3. The image processing apparatus according to claim 1, wherein a selection of processing subject pixels to be subjected to the image quality adjustment is carried out by sequentially selecting a one-pixel width frame-shaped image area from the outside toward the inside of the ith image block, and scanning four sides configuring the selected frame-shaped image area in a preset order.

4. The image processing apparatus according to claim 1, wherein the selection of processing subject pixels to be subjected to the image quality adjustment is carried out by scanning pixels in a spiral pattern.

5. An image display apparatus comprising:

the image processing apparatus according to claim 1; and an image display section which displays an image based on an image data output from the image processing apparatus.

6. An image processing method comprising:

an image division step which divides input image data configuring one screen into N (N is an integer of 2 or more) image blocks; and N image processing steps which carry out image processings in parallel on every N image blocks, an ith (i is an integer of 1 to N) image processing step including K (K is an integer of 2 or more) image quality adjustment steps which sequentially carry out image quality adjustments in series on pixel data of the image blocks, wherein each image quality adjustment step selects processing subject pixels, in order from pixels positioned outside toward pixels positioned inside the image block, carrying out the image quality adjustment, and at least one of the second to Kth image quality adjustment steps is a filtering step which carries out a filtering process.

* * * * *